(12) United States Patent
Passey et al.

(10) Patent No.: US 7,756,898 B2
(45) Date of Patent: Jul. 13, 2010

(54) SYSTEMS AND METHODS FOR NOTIFYING LISTENERS OF EVENTS

(75) Inventors: Aaron J. Passey, Seattle, WA (US); Neal T. Fachan, Seattle, WA (US)

(73) Assignee: Isilon Systems, Inc., Seattle, WA (US)

( * ) Notice: Subject to any disclaimer, the term of this patent is extended or adjusted under 35 U.S.C. 154(b) by 301 days.

(21) Appl. No.: 11/396,282

(22) Filed: Mar. 31, 2006

(65) Prior Publication Data

US 2007/0233710 A1    Oct. 4, 2007

(51) Int. Cl.
G06F 7/00    (2006.01)
(52) U.S. Cl. .................. 707/793; 707/803; 707/821
(58) Field of Classification Search .................. None
See application file for complete search history.

(56) References Cited

U.S. PATENT DOCUMENTS

| | | | |
|---|---|---|---|
| 5,163,131 A | 11/1992 | Row et al. | |
| 5,181,162 A * | 1/1993 | Smith et al. | 715/209 |
| 5,212,784 A | 5/1993 | Sparks | |
| 5,230,047 A | 7/1993 | Frey et al. | |
| 5,251,206 A * | 10/1993 | Calvignac et al. | 370/352 |
| 5,258,984 A | 11/1993 | Menon et al. | |
| 5,329,626 A | 7/1994 | Klein et al. | |
| 5,359,594 A | 10/1994 | Gould et al. | |
| 5,403,639 A | 4/1995 | Belsan et al. | |
| 5,548,724 A | 8/1996 | Akizawa et al. | |
| 5,596,709 A | 1/1997 | Bond et al. | |
| 5,612,865 A | 3/1997 | Dasgupta | |
| 5,649,200 A | 7/1997 | Leblang et al. | |
| 5,657,439 A | 8/1997 | Jones et al. | |
| 5,668,943 A | 9/1997 | Attanasio et al. | |
| 5,694,593 A | 12/1997 | Baclawski | |
| 5,696,895 A | 12/1997 | Hemphill et al. | |
| 5,734,826 A | 3/1998 | Olnowich et al. | |
| 5,761,659 A | 6/1998 | Bertoni | |
| 5,774,643 A | 6/1998 | Lubbers et al. | |
| 5,799,305 A | 8/1998 | Bortvedt et al. | |
| 5,805,578 A | 9/1998 | Stirpe et al. | |
| 5,805,900 A | 9/1998 | Fagen et al. | |
| 5,806,065 A | 9/1998 | Lomet | |
| 5,822,790 A | 10/1998 | Mehrotra | |
| 5,862,312 A | 1/1999 | Mann | |

(Continued)

FOREIGN PATENT DOCUMENTS

EP    0774723    5/1997

(Continued)

OTHER PUBLICATIONS

Nov. 15, 2002 International Search Report PCT/US02/24728.

(Continued)

*Primary Examiner*—John R. Cottingham
*Assistant Examiner*—Nicholas E Allen
(74) *Attorney, Agent, or Firm*—Knobbe Martens Olson & Bear LLP

(57) ABSTRACT

In one embodiment, systems and methods are provided for tracking events wherein an event system monitors certain areas of a system. When an event occurs in one area of the system, the event system notifies the processes listening to that area of the system of the event.

14 Claims, 19 Drawing Sheets

U.S. PATENT DOCUMENTS

| | | | |
|---|---|---|---|
| 5,870,563 A | 2/1999 | Roper et al. | |
| 5,878,410 A * | 3/1999 | Zbikowski et al. | 707/2 |
| 5,878,414 A | 3/1999 | Hsiao et al. | |
| 5,884,046 A | 3/1999 | Antonov | |
| 5,884,098 A | 3/1999 | Mason, Jr. | |
| 5,884,303 A | 3/1999 | Brown | |
| 5,890,147 A * | 3/1999 | Peltonen et al. | 707/100 |
| 5,933,834 A | 8/1999 | Aichelen | |
| 5,943,690 A | 8/1999 | Dorricott et al. | |
| 5,966,707 A | 10/1999 | Van Huben et al. | |
| 5,996,089 A | 11/1999 | Mann | |
| 6,021,414 A | 2/2000 | Fuller | |
| 6,029,168 A | 2/2000 | Frey | |
| 6,038,570 A | 3/2000 | Hitz et al. | |
| 6,044,367 A | 3/2000 | Wolff | |
| 6,055,543 A | 4/2000 | Christensen et al. | |
| 6,070,172 A | 5/2000 | Lowe | |
| 6,081,833 A | 6/2000 | Okamato et al. | |
| 6,081,883 A | 6/2000 | Popelka et al. | |
| 6,108,759 A | 8/2000 | Orcutt et al. | |
| 6,117,181 A * | 9/2000 | Dearth et al. | 703/22 |
| 6,122,754 A | 9/2000 | Litwin et al. | |
| 6,138,126 A | 10/2000 | Hitz et al. | |
| 6,154,854 A | 11/2000 | Stallmo | |
| 6,173,374 B1 | 1/2001 | Heil et al. | |
| 6,209,059 B1 | 3/2001 | Ofer et al. | |
| 6,219,693 B1 | 4/2001 | Napolitano et al. | |
| 6,321,345 B1 | 11/2001 | Mann | |
| 6,334,168 B1 | 12/2001 | Islam et al. | |
| 6,353,823 B1 | 3/2002 | Kumar | |
| 6,384,626 B2 | 5/2002 | Tsai et al. | |
| 6,385,626 B1 | 5/2002 | Tamer et al. | |
| 6,397,311 B1 | 5/2002 | Capps | |
| 6,405,219 B2 | 6/2002 | Saether et al. | |
| 6,408,313 B1 | 6/2002 | Campbell et al. | |
| 6,434,574 B1 | 8/2002 | Day et al. | |
| 6,449,730 B2 | 9/2002 | Mann et al. | |
| 6,453,389 B1 | 9/2002 | Weinberger et al. | |
| 6,457,139 B1 | 9/2002 | D'Errico et al. | |
| 6,499,091 B1 | 12/2002 | Bergsten | |
| 6,502,172 B2 | 12/2002 | Chang | |
| 6,502,174 B1 | 12/2002 | Beardsley et al. | |
| 6,523,130 B1 | 2/2003 | Hickman et al. | |
| 6,526,478 B1 | 2/2003 | Kirby | |
| 6,546,443 B1 | 4/2003 | Kakivaya et al. | |
| 6,549,513 B1 | 4/2003 | Chao et al. | |
| 6,557,114 B2 | 4/2003 | Mann | |
| 6,567,894 B1 | 5/2003 | Hsu et al. | |
| 6,567,926 B2 | 5/2003 | Mann | |
| 6,571,244 B1 | 5/2003 | Larson | |
| 6,571,349 B1 | 5/2003 | Mann | |
| 6,574,745 B2 | 6/2003 | Mann | |
| 6,594,655 B2 | 7/2003 | Tal et al. | |
| 6,594,660 B1 | 7/2003 | Berkowitz et al. | |
| 6,598,174 B1 | 7/2003 | Parks et al. | |
| 6,618,798 B1 | 9/2003 | Burton et al. | |
| 6,662,184 B1 | 12/2003 | Friedberg | |
| 6,671,686 B2 | 12/2003 | Pardon et al. | |
| 6,671,704 B1 | 12/2003 | Gondi et al. | |
| 6,732,125 B1 | 5/2004 | Autrey et al. | |
| 6,848,029 B2 | 1/2005 | Coldewey | |
| 6,907,011 B1 | 6/2005 | Miller et al. | |
| 6,917,942 B1 | 7/2005 | Burns et al. | |
| 6,922,696 B1 | 7/2005 | Lincoln et al. | |
| 6,934,878 B2 | 8/2005 | Massa et al. | |
| 6,940,966 B2 | 9/2005 | Lee | |
| 6,954,435 B2 | 10/2005 | Billhartz et al. | |
| 6,990,604 B2 | 1/2006 | Binger | |
| 7,007,044 B1 | 2/2006 | Rafert et al. | |
| 7,007,097 B1 | 2/2006 | Huffman et al. | |
| 7,017,003 B2 | 3/2006 | Murotani et al. | |
| 7,069,320 B1 | 6/2006 | Chang et al. | |
| 7,111,305 B2 | 9/2006 | Solter et al. | |
| 7,124,264 B2 | 10/2006 | Yamashita | |
| 7,146,524 B2 | 12/2006 | Patel et al. | |
| 7,152,182 B2 | 12/2006 | Ji et al. | |
| 7,177,295 B1 | 2/2007 | Sholander et al. | |
| 7,184,421 B1 | 2/2007 | Liu et al. | |
| 7,228,299 B1 | 6/2007 | Harmer et al. | |
| 7,240,235 B2 | 7/2007 | Lewalski-Brechter | |
| 7,257,257 B2 | 8/2007 | Anderson et al. | |
| 7,318,134 B1 | 1/2008 | Oliveira et al. | |
| 7,373,426 B2 | 5/2008 | Jinmei et al. | |
| 7,451,341 B2 | 11/2008 | Okaki et al. | |
| 7,509,448 B2 | 3/2009 | Fachan et al. | |
| 7,533,298 B2 | 5/2009 | Smith et al. | |
| 2001/0047451 A1 | 11/2001 | Noble et al. | |
| 2002/0010696 A1 * | 1/2002 | Izumi | 707/7 |
| 2002/0035668 A1 | 3/2002 | Nakano et al. | |
| 2002/0055940 A1 * | 5/2002 | Elkan | 707/104.1 |
| 2002/0072974 A1 * | 6/2002 | Pugliese et al. | 705/14 |
| 2002/0075870 A1 | 6/2002 | de Azevedo et al. | |
| 2002/0078180 A1 * | 6/2002 | Miyazawa | 709/219 |
| 2002/0083078 A1 | 6/2002 | Pardon et al. | |
| 2002/0095438 A1 | 7/2002 | Rising et al. | |
| 2002/0124137 A1 | 9/2002 | Ulrich et al. | |
| 2002/0138559 A1 | 9/2002 | Ulrich et al. | |
| 2002/0156840 A1 | 10/2002 | Ulrich et al. | |
| 2002/0156891 A1 | 10/2002 | Ulrich et al. | |
| 2002/0156973 A1 | 10/2002 | Ulrich et al. | |
| 2002/0156974 A1 | 10/2002 | Ulrich et al. | |
| 2002/0156975 A1 | 10/2002 | Staub et al. | |
| 2002/0161846 A1 | 10/2002 | Ulrich et al. | |
| 2002/0161850 A1 | 10/2002 | Ulrich et al. | |
| 2002/0161973 A1 | 10/2002 | Ulrich et al. | |
| 2002/0163889 A1 | 11/2002 | Yemini et al. | |
| 2002/0165942 A1 | 11/2002 | Ulrich et al. | |
| 2002/0166026 A1 | 11/2002 | Ulrich et al. | |
| 2002/0166079 A1 | 11/2002 | Ulrich et al. | |
| 2002/0169827 A1 | 11/2002 | Ulrich et al. | |
| 2002/0174295 A1 | 11/2002 | Ulrich et al. | |
| 2002/0174296 A1 | 11/2002 | Ulrich et al. | |
| 2002/0178162 A1 | 11/2002 | Ulrich et al. | |
| 2002/0191311 A1 | 12/2002 | Ulrich et al. | |
| 2002/0194523 A1 | 12/2002 | Ulrich et al. | |
| 2002/0194526 A1 | 12/2002 | Ulrich et al. | |
| 2002/0198864 A1 | 12/2002 | Ostermann et al. | |
| 2003/0005159 A1 | 1/2003 | Kumhyr | |
| 2003/0014391 A1 | 1/2003 | Evans et al. | |
| 2003/0033308 A1 | 2/2003 | Patel et al. | |
| 2003/0109253 A1 | 6/2003 | Fenton et al. | |
| 2003/0125852 A1 | 7/2003 | Schade et al. | |
| 2003/0135514 A1 | 7/2003 | Patel et al. | |
| 2003/0158873 A1 | 8/2003 | Sawdon et al. | |
| 2003/0163726 A1 | 8/2003 | Kidd | |
| 2003/0172149 A1 | 9/2003 | Edsall et al. | |
| 2003/0177308 A1 | 9/2003 | Lewalski-Brechter | |
| 2003/0182325 A1 | 9/2003 | Manely et al. | |
| 2004/0003053 A1 | 1/2004 | Williams | |
| 2004/0024963 A1 | 2/2004 | Talagala et al. | |
| 2004/0078812 A1 | 4/2004 | Calvert | |
| 2004/0133670 A1 * | 7/2004 | Kaminsky et al. | 709/224 |
| 2004/0143647 A1 * | 7/2004 | Cherkasova | 709/219 |
| 2004/0153479 A1 | 8/2004 | Mikesell et al. | |
| 2004/0189682 A1 | 9/2004 | Troyansky et al. | |
| 2004/0199734 A1 | 10/2004 | Rajamani et al. | |
| 2004/0205141 A1 | 10/2004 | Goland | |
| 2004/0230748 A1 | 11/2004 | Ohba | |
| 2004/0260673 A1 | 12/2004 | Hitz et al. | |
| 2005/0066095 A1 | 3/2005 | Mullick et al. | |
| 2005/0114402 A1 | 5/2005 | Guthrie | |
| 2005/0114609 A1 | 5/2005 | Shorb | |
| 2005/0131860 A1 * | 6/2005 | Livshits | 707/1 |
| 2005/0171960 A1 * | 8/2005 | Lomet | 707/100 |

| | | | |
|---|---|---|---|
| 2005/0171962 | A1* | 8/2005 | Martin et al. ............... 707/100 |
| 2005/0188052 | A1* | 8/2005 | Ewanchuk et al. .......... 709/217 |
| 2005/0192993 | A1 | 9/2005 | Messinger |
| 2005/0289169 | A1 | 12/2005 | Adya et al. |
| 2005/0289188 | A1 | 12/2005 | Nettleton et al. |
| 2006/0004760 | A1 | 1/2006 | Clift et al. |
| 2006/0041894 | A1 | 2/2006 | Cheng |
| 2006/0059467 | A1 | 3/2006 | Wong |
| 2006/0074922 | A1* | 4/2006 | Nishimura ................. 707/100 |
| 2006/0083177 | A1* | 4/2006 | Iyer et al. ................... 370/252 |
| 2006/0095438 | A1 | 5/2006 | Fachan et al. |
| 2006/0101062 | A1 | 5/2006 | Godman et al. |
| 2006/0129584 | A1* | 6/2006 | Hoang et al. ................ 707/101 |
| 2006/0129631 | A1 | 6/2006 | Na et al. |
| 2006/0129983 | A1* | 6/2006 | Feng ........................ 717/120 |
| 2006/0230411 | A1 | 10/2006 | Richter et al. |
| 2006/0277432 | A1 | 12/2006 | Patel |
| 2006/0288161 | A1 | 12/2006 | Cavallo |
| 2007/0091790 | A1 | 4/2007 | Passey et al. |
| 2007/0094269 | A1 | 4/2007 | Mikesell et al. |
| 2007/0094277 | A1 | 4/2007 | Fachan et al. |
| 2007/0094310 | A1 | 4/2007 | Passey et al. |
| 2007/0094431 | A1 | 4/2007 | Fachan |
| 2007/0094452 | A1 | 4/2007 | Fachan |
| 2007/0168351 | A1 | 7/2007 | Fachan |
| 2007/0171919 | A1 | 7/2007 | Godman et al. |
| 2007/0195810 | A1 | 8/2007 | Fachan |
| 2007/0233684 | A1 | 10/2007 | Verma et al. |
| 2007/0233710 | A1 | 10/2007 | Passey et al. |
| 2008/0005145 | A1 | 1/2008 | Worrall |
| 2008/0010507 | A1 | 1/2008 | Vingralek |
| 2008/0021907 | A1 | 1/2008 | Patel et al. |
| 2008/0031238 | A1 | 2/2008 | Harmelin et al. |
| 2008/0034004 | A1 | 2/2008 | Cisler et al. |
| 2008/0044016 | A1 | 2/2008 | Henzinger |
| 2008/0046432 | A1 | 2/2008 | Anderson et al. |
| 2008/0046443 | A1 | 2/2008 | Fachan et al. |
| 2008/0046444 | A1 | 2/2008 | Fachan et al. |
| 2008/0046445 | A1 | 2/2008 | Passey et al. |
| 2008/0046475 | A1 | 2/2008 | Anderson et al. |
| 2008/0046476 | A1 | 2/2008 | Anderson et al. |
| 2008/0046667 | A1 | 2/2008 | Fachan et al. |
| 2008/0059541 | A1 | 3/2008 | Fachan et al. |
| 2008/0126365 | A1 | 5/2008 | Fachan et al. |
| 2008/0154978 | A1 | 6/2008 | Lemar et al. |
| 2008/0168458 | A1 | 7/2008 | Fachan et al. |

FOREIGN PATENT DOCUMENTS

| | | |
|---|---|---|
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |

OTHER PUBLICATIONS

Apr. 20, 2004 International Search Report PCT/US03/36699.
Aug. 6, 2004 International Search Report PCT/US03/33704.
European Search Report dated May 21, 2007 issued to EP application No. 02756944.1-2201.
Philip A. Bernstein, Vassos Hadzilacos, and Nathan Goodman, *Concurrency Control and Recovery in Database Systems*, Addison-Wesley, 1987.
Birk, Y., *Deterministic load-balancing schemes for disk-based video-on-demand storage servers*, Mass Storage Systems 1995; Storage—At the Forefront of Information Infrastructures', Proceedings of the Fourteenth IEEE Symposium on Monterey, CA, Sep. 11-14, 1995, pp. 17-25.
Kenneth P. Birman, *Building Secure and Reliable Network Applications*, Manning, 1996, pp. 1-327.
Kenneth P. Birman, *Building Secure and Reliable Network Applications*, Manning, 1996, pp. 328-619.
Coulouris et al., *Distributed Systems Concepts and Design*; Addison-Wesley, Second Edition, 1994, pp. 353-371 and 377-405.
Jim Gray and Andreas Reuter, *Transaction Processing: Concepts and Techniques*, Morgan Kaufmann, 1993, pp. 1-328.
Jim Gray and Andreas Reuter, *Transaction Processing: Concepts and Techniques*, Morgan Kaufmann, 1993, pp. 329-664.
Jim Gray and Andreas Reuter, *Transaction Processing: Concepts and Techniques*, Morgan Kaufmann, 1993, pp. 665-1105.
Nancy A. Lynch, *Distributed Algorithms*, Morgan Kaufmann, 1996, pp. 1-409.
Nancy A. Lynch, *Distributed Algorithms*, Morgan Kaufmann, 1996 pp. 410-871.
Sape Mullender, editor, *Distributed Systems* ($2^{nd}$ Ed.), ACM Press/ Addison-Wesley Publishing Co., New York, NY, USA, 1993, pp. 1-327.
Sape Mullender, editor, *Distributed Systems* ($2^{nd}$ Ed.), ACM Press/ Addison-Wesley Publishing Co., New York, NY, USA, 1993, pp. 328-604.
Gibson, Garth A. et al., *The Scotch Parallel Storage System*, IEEE, 1995, pp. 403-410.
Gerhard Weikum, et al., *Transactional Information Systems: Theory, Algorithms, and the Practice of Concurrency Control and Recovery*, Morgan Kaufmann, 2002, pp. 1-450.
Gerhard Weikum, et al., *Transactional Information Systems: Theory, Algorithms, and the Practice of Concurrency Control and Recovery*, Morgan Kaufmann, 2002, pp. 451-863.
Sanjay Ghemawat et al., *The Google File System*, Symposium on Operating Systems Principles, Oct. 19-22, 2003, 15 pages, Bolton Landing, NY.
Pei Cao et al., The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Bob Duzett, et al., *An Overview of the nCube 3 Supercomputer*, IEEE, Jul. 1992, pp. 458-464.
John Henry Hartman, *The Zebra Striped Network File System*, (Sc.B. (Brown University) 1987, pp. 1-148.
Darrell D.E, Long et al., *Swift/RAID: A Distributed RAID System*, Computing Systems, vol. 7, No. 3 Summer 1994, pp. 333-359.
Michael Stonebraker et al., *Distributed Raid: A new Multiple copy Algorithm*, IEEE 1990, pp. 430-434, Berkeley, California.
Stallings, William, *Operating Systems*, Prentice Hall, Fourth Edition; 2001, pp. 197-253 and 265-293.
United States Court of Appeals, Federal Circuit, *Seachange International, Inc.* Vs. *nCUBE, Corp.*, Oct. 26, 2004, 28 pages.
United States Court of Appeals, Federal Circuit, *Seachange International, Inc.* Vs. *C-Corp, Inc.*, Jun. 29, 2005, 22 pages.
United States District Court, Delaware, *Seachange International, Inc.* Vs. *nCUBE, Corp.*, Apr. 7, 2004, 13 pages.
United States District Court, Delaware, *Seachange International, Inc.* Vs. *nCUBE, Corp.*, Aug. 29, 2000, 12 pages.
Feb. 22, 2008 Int'l Search report PCT/US07/018326, 20 pages.
May 8, 2008 Int'l Search report PCT/US07/018324, 13 pages.
Kumar Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand column, line 1—p. 447, last line.
Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.

Steven M. Bauer, Letter to Arthur S. Rose, Jun. 7, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007 (exhibits listed separately below), 1 page.
Isilon Systems, "Isilon IQ Plateform Overview", 4 pages, 2007 (Exhibit A).
Isilon Systems, "Uncompromising Reliability through Clustered Storage", Sep. 2006, 10 pages (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems 3rd ed, Sep. 30, 1999, Addison-Wesley, pp. 155, 169, 171, 172, 173, 178, 181, 182, 381, 771.
MCSA/MSCE/MCDBA Self Paced Training Kit: MS SQL Server 2000 System Administration, May 14, 2003, Microsoft Press, Second Edition, 12 pages.
Supp EPO Search Report, App. No. EP 03 78 3599; dated Apr. 29, 2008, 2 pages.
Levy E., Ed.—Institute of Electrical and Electronics Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
Wedde H. F., et al.: "A universal framework for managing metadata in the distributed Dragon Slayer System", Proceedings of the Euromicro Conference. Euromicro. Informatics: Inventing the Future, Proceedings of Euromicro Workshop on Multimedia and Telecommunications, vol. 2, Sep. 5, 2000, pp. 96-101.
Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.
Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.
Lougher P. et al., "Scalable storage servers for digital audio and video," International Conference on Storage and Recording Systems, 1994, Keele, UK, Jan. 1, 1994, pp. 140-143.
Reddy, P. Krishna et al., Reducing the blocking in two phase commit with backup sites Apr. 15, 2003, Elsevier, pp. 39-47.

* cited by examiner

| INODE | |
|---|---|
| MODE | DIRECTORY |
| LIN | 10 |
| LISTENING SET | { } |
| CACHE GENERATION NUMBER | 5 |
| OTHER FIELDS ⋮ | ⋮ |

*FIG. 2*

SYSTEMS AND METHODS FOR NOTIFYING LISTENERS OF EVENTS

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

FIELD OF THE INVENTION

This invention relates generally to systems and methods of notifying listeners of events.

BACKGROUND

The increase in processing power of computer systems has ushered in a new era in which information is accessed on a constant basis. One response has been to distribute processing requests across multiple nodes or devices. A distributed architecture allows for more flexible configurations with respect to factors such as speed, bandwidth management, and other performance and reliability parameters.

The distributed architecture allows multiple nodes to process incoming requests. Accordingly, different process requests may be handled by different nodes. Problems may occur, however, when one of the nodes modifies information that effects other nodes.

Because of the foregoing challenges and limitations, there is an ongoing need to improve the manner in which nodes of a distributed architecture process events.

SUMMARY OF THE INVENTION

The systems and methods generally relate to notifying listeners of events.

In one embodiment, an event listening system is provided. The event listening system may include a file system including a plurality of files, the plurality of files logically stored in a tree; for each of the plurality of files, a first data structure configured to track a set of listening files that are listening for events that affect the corresponding file; a plurality of processes that each listen for events that affect at least one of the plurality of files; a second data structure configured to track, for each of the plurality of files, which of the plurality of processes are listening to each of the files; a listening module configured to receive an identifier for a first file of the plurality of files and to determine whether the first file is relevant to any of the plurality of processes using the first data structure and the second data structure; a traverse module configured to traverse a first set of first data structures that correspond to a subset of the plurality of files that represent one branch of the tree; and an update module configured to update at least one of the corresponding first data structures of the file in at least one traversed level by reviewing a scope of at least one of the listening files of the first data structure that corresponds to the file's parent.

In a further embodiment, a method for listening for events is provided. The method may include logically storing a plurality of files in a tree; for each of the plurality of files, tracking a set of listening files that are listening for events that affect the corresponding file; storing a plurality of processes that each listen for events that affect at least one of the plurality of files; for each of the plurality of files, tracking which of the plurality of processes are listening to each of the files; receiving an identifier for a first file of the plurality of files; determining whether the first file is relevant to any of the plurality of processes using the first data structure and the second data structure; traversing a first set of first data structures that correspond to a subset of the plurality of files that represent one branch of the tree; and updating at least one of the corresponding first data structures of the file in at least one traversed level, wherein updating includes reviewing a scope of at least one of the listening files of the first data structure that corresponds to the file's parent.

In an additional embodiment, a system for listening for events is provided. The system may include a file structure comprising a plurality of files that are logically stored in a tree; for each of the plurality of files, a data structure corresponding to each files, the data structure comprising: a set of identifiers of the plurality of files that are listening for events that affect the corresponding file; and an indication of the currentness of the data structure.

In a further embodiment, a method for listening for events is provided. The method may include logically storing a plurality of files in a tree; and for each of the plurality of files, storing a data structure corresponding to each files, the data structure comprising a set of identifiers of the plurality of files that are listening for events that affect the corresponding file and an indication of the currentness of the data structure.

In an additional embodiment, a system for queuing event messages in a file system is provided. The system may include a plurality of processes that each listen for events that affect at least one of a plurality of files; a first data structure configured to determine, for each of the plurality of processes, a set of listening files to which each of the plurality of processes is listening; and a message module configured to receive an event message related to a first file of the plurality of files, the event message including an indication of a minimum scope that would have generated the event message, to search the first data structure to determine a first subset of the plurality of processes that that listen for files that are affected by the event using the sets of listening files, to determine a second subset of the first subset by removing from the first subset, processes whose scope is less than the minimum scope of the event message, and to inform the second subset of the event message.

For purposes of summarizing this invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 2 illustrates one embodiment of the elements of an inode data structure in a distributed file system.

Figure 1A:
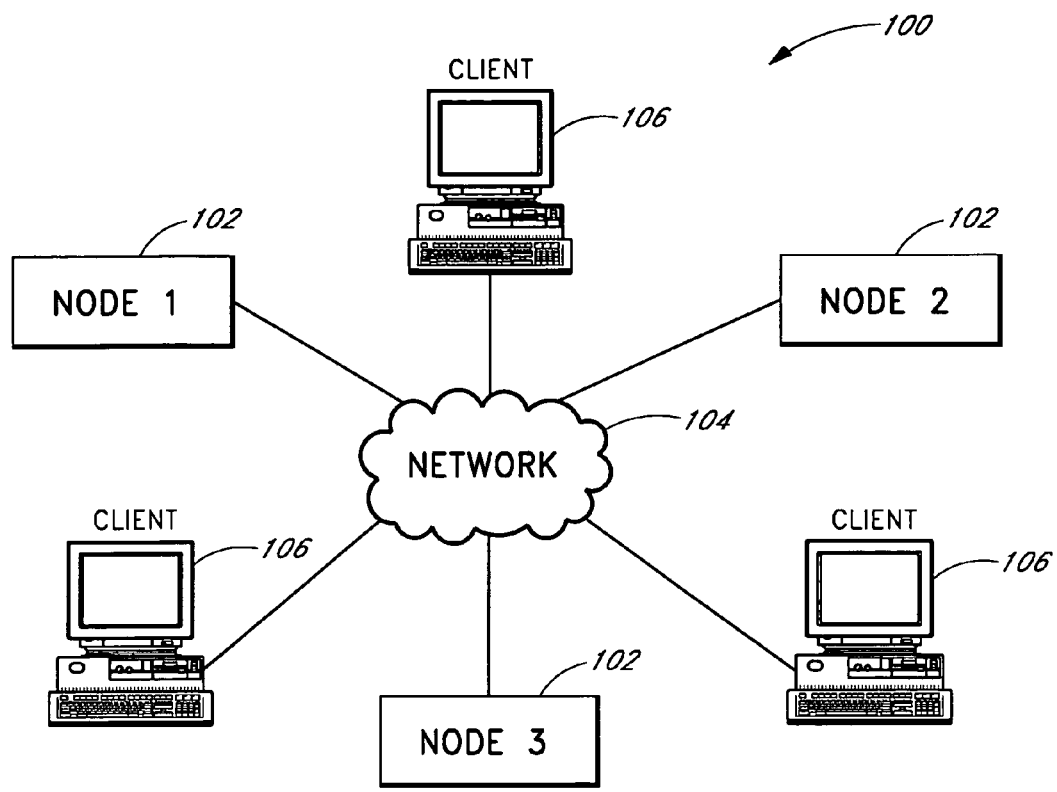
FIGS. 1A and 1B illustrate, respectively, one embodiment of physical and logical connections of one embodiment of nodes in a system.

These and other features will now be described with reference to the drawings summarized above. The drawings and the associated descriptions are provided to illustrate embodiments of the invention and not to limit the scope of the invention. Throughout the drawings, reference numbers may be re-used to indicate correspondence between referenced elements. In addition, the first digit of each reference number generally indicates the figure in which the element first appears.

DETAILED DESCRIPTION OF PREFERRED EMBODIMENTS

Systems and methods which represent one embodiment of an example application of the invention will now be described with reference to the drawings. Variations to the systems and methods which represent other embodiments will also be described.

For purposes of illustration, some embodiments will be described in a context of a distributed file system. The present invention is not limited by the type of environment in which the systems and methods are used, however, and the systems and methods may be used in other environments, such as, for example, other file systems, other distributed systems, the Internet, the World Wide Web, a private network for a hospital, a broadcast network for government agency, an internal network of a corporate enterprise, an Internet, a local area network, a wide area network, a wired network, a wireless network, and so forth. Some of the figures and descriptions, however, relate to an embodiment of the invention wherein the environment is that of a distributed file system. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the appended claims.

I. Overview

In one embodiment, systems and methods are provided for tracking events in a distributed file system. In this embodiment, an event system monitors certain areas of a file system. When an event occurs in one area of the distributed file system, the event system notifies the processes listening to that area of the distributed file system of the event. One example of a listening application is a directory management application. When the directory management application opens a window on a particular directory, it may instantiate a listener on that directory. When another application, such as a word processor, creates a new file in that directory, the event system notifies the listening application, which can then immediately update the window to show the new file. Another example of a listening application is an indexing service which listens to a subdirectory recursively. An indexing service may, for example, store an index for words and phrases appearing within a certain group of documents. The index may be used to enhance document searching functionality. Whenever the service is notified of an event, it may re-index the file or files corresponding to that event. An event system may also be used internally by the distributed file system to monitor configuration files and to take appropriate actions when they change. In general, a listening process, which includes an executed instantiation of an application, may refer to the client process that requests a listener on the distributed file system, and the listener may refer to the data structures initiated by the event system to monitor and report events to the listening process.

In one embodiment of the event system illustrated in FIGS. 1 through 17, there are three general areas that the event system implements: (1) maintaining a cluster-wide set of listeners; (2) determining whether a specified file is being listened to; and (3) notifying listeners of those files of the events. Before describing these areas in more detail, some preliminary background will be provided regarding the components and connections of the exemplary distributed network, a metadata element of the exemplary file system, and event listeners maintained by the event system.

A. Components and Connections

An event system may be designed for a distributed network architecture. FIG. 1A illustrates the connections of elements in one embodiment of a distributed system 100. In the illustrated embodiment, there are three nodes 102. These nodes are connected through a network 104. Client processes access the distributed system 100 through the network 104, using, for example, client machines 106. Although in the illustrated embodiment there is a single network 104 connecting both nodes 102 and client machines 106, in other embodiments there may be separate networks. For instance, there may be a front-end network connecting the nodes 102 to the client machines 106 and a back-end network for inter-node communication.

Figure 1B:
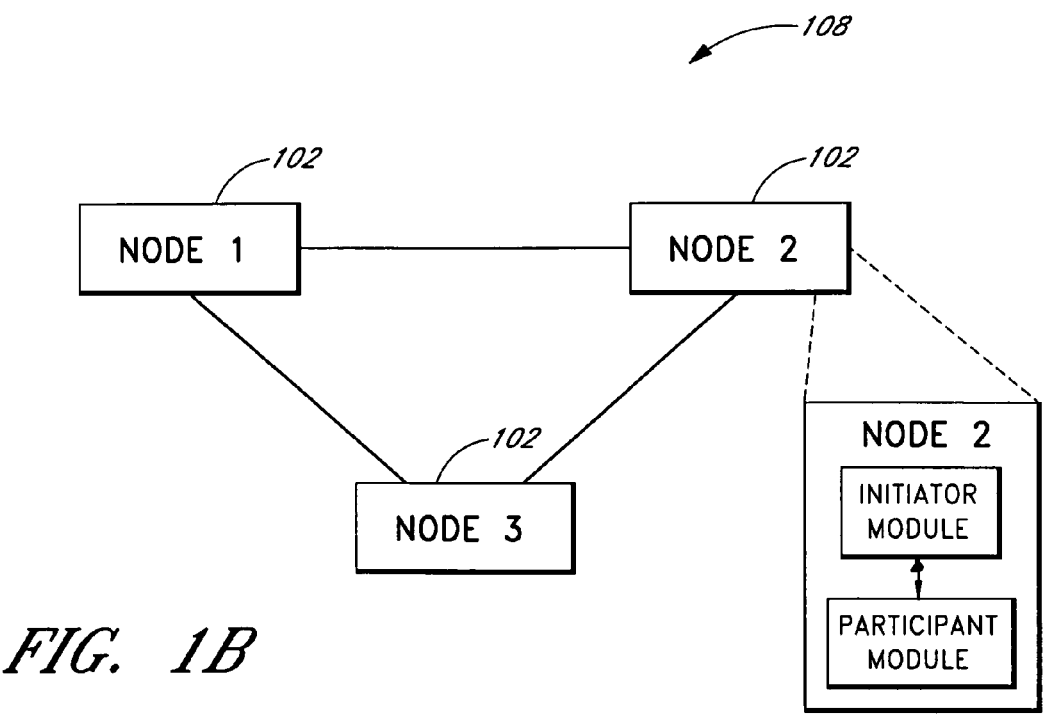

FIG. 1B illustrates one possible logical connection of three nodes 102, forming a cluster 108. In the illustrated embodiment, the nodes 102 in cluster 108 are connected in a fully connected topology. A fully connected topology is a network where each of the nodes in the network is connected to every other node in the network. Although in the illustrated embodiment the nodes 102 are arranged in a fully connected network topology, in other embodiments of the invention, the cluster 108 of nodes 102 may be arranged in other topologies, including, but not limited to, the following topologies: ring, mesh, star, line, tree, bus topologies, and so forth. It will be appreciated by one skilled in the art that various network topologies may be used to implement different embodiments of the invention. In addition, it is recognized that the nodes 102 may be connected directly, indirectly, or a combination of the two, and that all of the nodes may be connected using the same type of connection or one or more different types of connections. It is also recognized that in other embodiments, a different number of nodes may be included in the cluster, such as, for example, 2, 16, 83, 6, 883, 10,000, and so forth.

In one embodiment, the nodes 102 are interconnected through a bi-directional communication link where messages are received in the order they are sent. In one embodiment, the link comprises a "keep-alive" mechanism that quickly detects when nodes or other network components fail, and the nodes are notified when a link goes up or down. In one embodiment, the link includes a TCP connection. In other embodiments, the link includes an SDP connection over Infiniband, a wireless network, a wired network, a serial connection, IP over FibreChannel, proprietary communication links, connection based datagrams or streams, and/or connection based protocols.

B. Distributed File System

One example implementation of a distributed architecture is a distributed file system. An event system may be implemented for a distributed file system, notifying listening processes of certain events on files and directories within the file system. In one embodiment of a distributed file system, metadata structures, also referred to as inodes, are used to monitor and manipulate the files and directories within the system. An inode is a data structure that describes a file or directory and may be stored in a variety of locations including on disk and/or in memory. The inode in-memory may include a copy of the on-disk data plus additional data used by the system, including the fields associated with the data structure and/or information about the event system. The nodes of a distributed system, such as nodes 102, may implement an inode cache. Such a cache may be implemented as a global hash table that may be configured to store the most recently used inodes. In one implementation, the inode cache may store more than 150,000 inodes and the inode may be around 1 KB of data in memory though it is recognized that a variety of different implementations may be used with caches of different sizes and inodes of different sizes. Information for an event system may include information regarding those listeners that are monitoring certain events on the file or directory corresponding to a particular inode. In one embodiment of an event system, this information is referred to as the event cache.

FIG. 2 illustrates one embodiment of an in-memory inode 200 of a distributed file system. In the illustrated embodiment, the inode 200 includes several fields. The inode 200 includes a mode field 202, which indicates, for example, either a file or directory. A file is a collection of data stored in one unit under a filename. A directory, similar to a file, is a collection of data stored in one unit under a directory name. A directory, however, is a specialized collection of data regarding elements in a file system. In one embodiment, a file system is organized in a tree-like structure. Directories are organized like the branches of trees. Directories may begin with a root directory and/or may include other branching directories. Files resemble the leaves or the fruit of the tree. Files, typically, do not include other elements in the file system, such as files and directories. In other words, files do not typically branch. Although in the illustrated embodiment an inode represents either a file or a directory, in other embodiments, an inode may include metadata for other elements in a distributed file system, in other distributed systems, or in other file systems.

The exemplary inode 200 also includes a LIN field 204. In one embodiment of a distributed file system, the LIN, or Logical Inode Number, is a unique identifier for the file or directory. It uniquely refers to the on-disk data structures for the file or directory. It may also be used as the index for the in-memory inodes, such as the index for a cache of in-memory inodes stored on nodes 102. In the exemplary inode 200, the LIN is 10. Accordingly, the exemplary inode 200 would be referred to as "inode 10."

The exemplary inode 200 also includes fields to implement an event cache, including a listening set field 206 and a cache generation number field 208. The listening set provides information about which other inodes are listening to this particular inode. An event system may use an inode's listening set to help notify listeners of particular events. The listening set of an inode may include a set of LINs, referring to a set of inodes, including perhaps the inode itself. If, for example, inodes 12, 13, and 16, or otherwise stated, the inodes whose LINs are 12, 13, and 16, respectively, are inodes being listened to by listeners whose scope is broad enough to include inode 10, then the listening set field 206 would include inodes 12, 13, and 16. In the illustrated embodiment, however, the listening set field 206 is empty, indicating that there are no listeners whose scope includes inode 10. The scope of listeners in an exemplary directory system with inode 10 is illustrated by FIG. 3.

Another element of the exemplary event cache described herein is the cache generation number. The exemplary inode 200, therefore, also includes a cache generation number field 208. As will be discussed in further detail below with reference to FIGS. 8A and 8B, an event system may use the cache generation number to identify whether the listening set of an inode, such as inode 10, is up-to-date. The exemplary inode 200 may also include other fields 210 and/or a subset of the fields discussed above.

One example of a distributed file system, in which embodiments of event systems and methods described herein may be implemented, is described in U.S. patent application Ser. No. 10/007,003 entitled "Systems and Methods for Providing a Distributed File System Utilizing Metadata to Track Information About Data Stored Throughout the System," filed Nov. 9, 2001 which claims priority to Application No. 60/309,803 filed Aug. 3, 2001, U.S. patent application Ser. No. 10/281,467 entitled "Systems and Methods for Providing A Distributed File System Incorporating a Virtual Hot Spare," filed Oct. 25, 2002, and U.S. patent application Ser. No. 10/714,326 entitled "Systems And Methods For Restriping Files In A Distributed File System," filed Nov. 14, 2003, which claims priority to Application No. 60/426,464, filed Nov. 14, 2002, all of which are hereby incorporated by reference herein in their entirety.

C. Event Listeners

In one embodiment, a listener is a logical construction of data and operations that monitors events on a particular resource or data structure. In a file system, listeners may be assigned to a particular file or directory. A single listener, however, may listen for events on more than just one resource, or more than one file or directory. Thus, in one embodiment, a listener may be defined with a particular scope. Events on a file or directory within the scope of a particular listener may be monitored with the other files and/or directories within the scope of that listener.

Figure 3C:
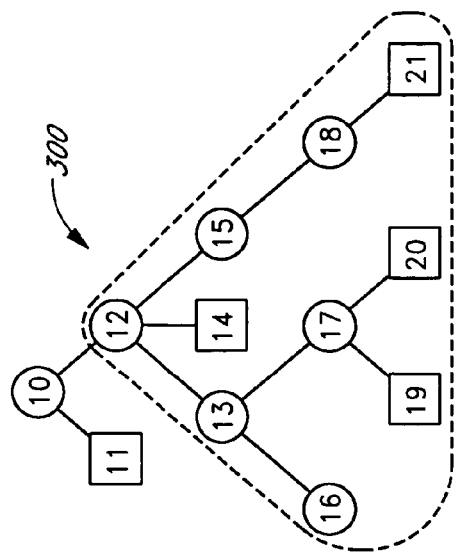
FIGS. 3A, 3B, and 3C illustrate one embodiment of the respective scope of single, children, and recursive listeners.
Figure 3B:
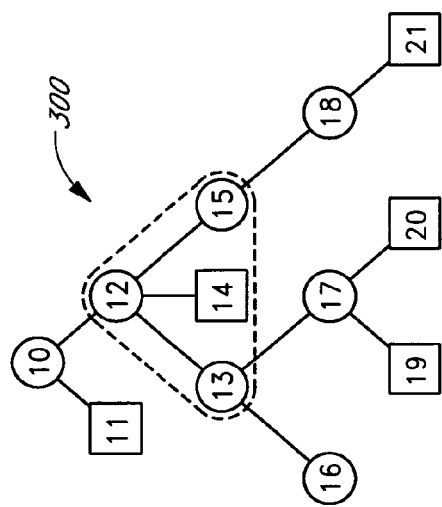
Figure 3A:
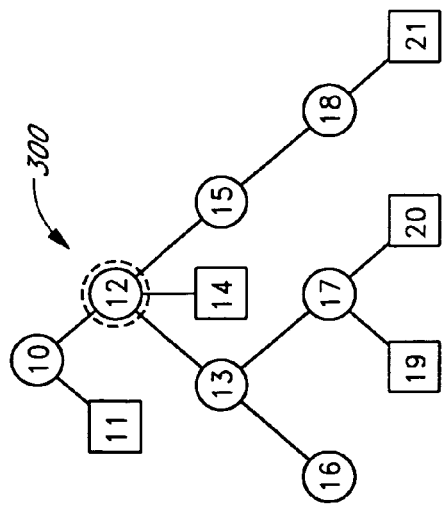

FIGS. 3A, 3B, and 3C illustrate one embodiment of the respective scope of single, children, and recursive listeners on an inode tree 300. In the illustrated embodiment, an inode tree, such as inode tree 300, corresponds to a file directory system. Each inode in the tree corresponds to a file or directory in the file directory system. Throughout the drawings representing features of a file system, circles are used to denote directories, and squares are used to denote files.

FIG. 3A illustrates one embodiment of the scope of a single listener. A process requesting a single listener is requesting notification of events on only the specified inode. In the illustrated embodiment, a listening process has requested event messages for events that occur on the directory corresponding to the inode 12.

FIG. 3B illustrates one embodiment the scope of a children listener. A listening process requesting a children listener is requesting notification of events on the specified inode and its children inodes. In the illustrated embodiment, inode 12 (directory) has three immediate descendents, or children: 13 (directory), 14 (file) and 15 (directory). A process listening to inode 12 with children scope listens for events that occur on inode 12 and all of the immediate descendents, or children, of inode 12.

FIG. 3C illustrates one embodiment of the scope of a recursive listener. A listening process requesting a recursive listener is requesting notification of events on the specified inode and its descendents, regardless of the immediacy. In the illustrated embodiment, inode 12 is being listened to recursively. A process listening to inode 12 recursively listens for events that occur on inode 12 and its descendents in the inode tree 300.

Although in the illustrated embodiments, only single, children, and recursive listeners are identified, one skilled in the art will appreciate that many different types of listening scopes may be defined in accordance with embodiments of the invention. For instance, another embodiment of the invention may define a grandchildren scope which listens to the events on the specified inode and its children and grandchildren, an only grandchild scope which listens to the events on the specified inode and its grandchildren, or a parent scope which listens to an inode and its parent. (Grandchildren inodes would be those inodes that are two-generation descendents of the originating inode.) In the illustrated inode tree 300, a grandchildren listener on inode 12 would listen to events on inodes 12, 13, 14, 15, 16, 17, and 18, an only grandchildren listener on inode 12 would listen to events on inodes 12, 16, 17, and 18, and a parent listener on inode 12 would listen to events on inodes 12 and 10. Alternatively or additionally, a listening scope may be defined that includes only files or only directories. Other possible listening scopes may also be defined.

As mentioned above, in one embodiment of the event system described herein, there are three main areas that the event system implements: (1) maintaining a cluster-wide set of listeners; (2) deciding if a specified file is being listened to; and (3) notifying listeners of those events on files that the listeners are listening for. Each of these three areas is described in further detail below.

II. Maintaining a Cluster-Wide Set of Listeners

FIGS. 4A, 4B, 4C, and 5 illustrate one embodiment of data structures that an event system may employ to maintain a cluster-wide set of listeners in a distributed system. In one embodiment of an event system, there are two logical entities that implement the listeners for a distributed file system: initiators and participants. In the exemplary embodiment of the event system, each listener is instantiated on one particular node 102 of cluster 108. This is the initiator node for that listener. A node 102 may be the initiator node for multiple listeners. In one embodiment, each node 102 keeps track of the instantiated listeners on that node in a single initiator hash table, which also keeps a queue, for each listener, of the listened-for events. Each node 102 may also execute certain operations to maintain the instantiated listeners and to notify nodes 102 of cluster 108 of any changes to the group of instantiated listeners, including additional listeners. Thus, the term "initiator" may be used to refer to the node upon which a listener is instantiated, the data structure that stores relevant events for that listener, and/or a module that executes operations related to the instantiated listeners.

In the exemplary event system, each node 102 of cluster 108 is a participant node for all of the instantiated listeners. The participants monitor each event to determine whether a particular node 102 is listening to the relevant inode for that event. In the exemplary embodiment, the relevant inode is the inode that is affected by the current event, and the particular node 102 listening to the relevant inode is called a listening node. Participants notify listening nodes of listened-for events with an event message. Although the exemplary event system contemplates nodes 102 acting as both initiators and participants, in other embodiments, certain nodes 102 within the cluster may be defined exclusively as initiators or participants. FIG. 1B illustrates one embodiment of a node that includes a participant module and an initiator module, through it is recognized that in some embodiments one or more of the nodes may include a participant module or may instead include an initiator module.

As used herein, the word module refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

A. Initiator Data Structures

Figure 4A:
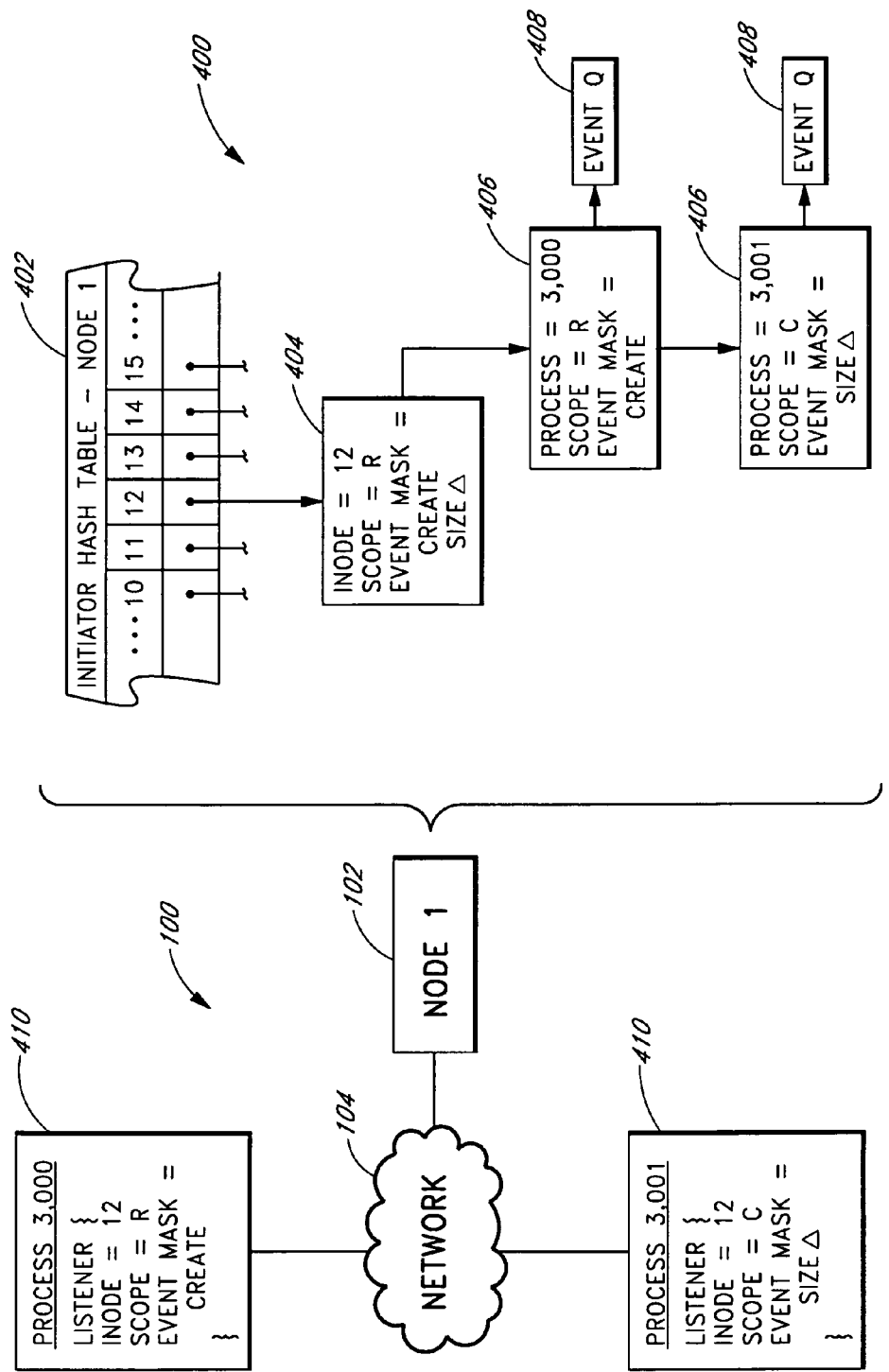
FIGS. 4A, 4B and 4C illustrate one embodiment of initiator hash tables.
Figure 4B:
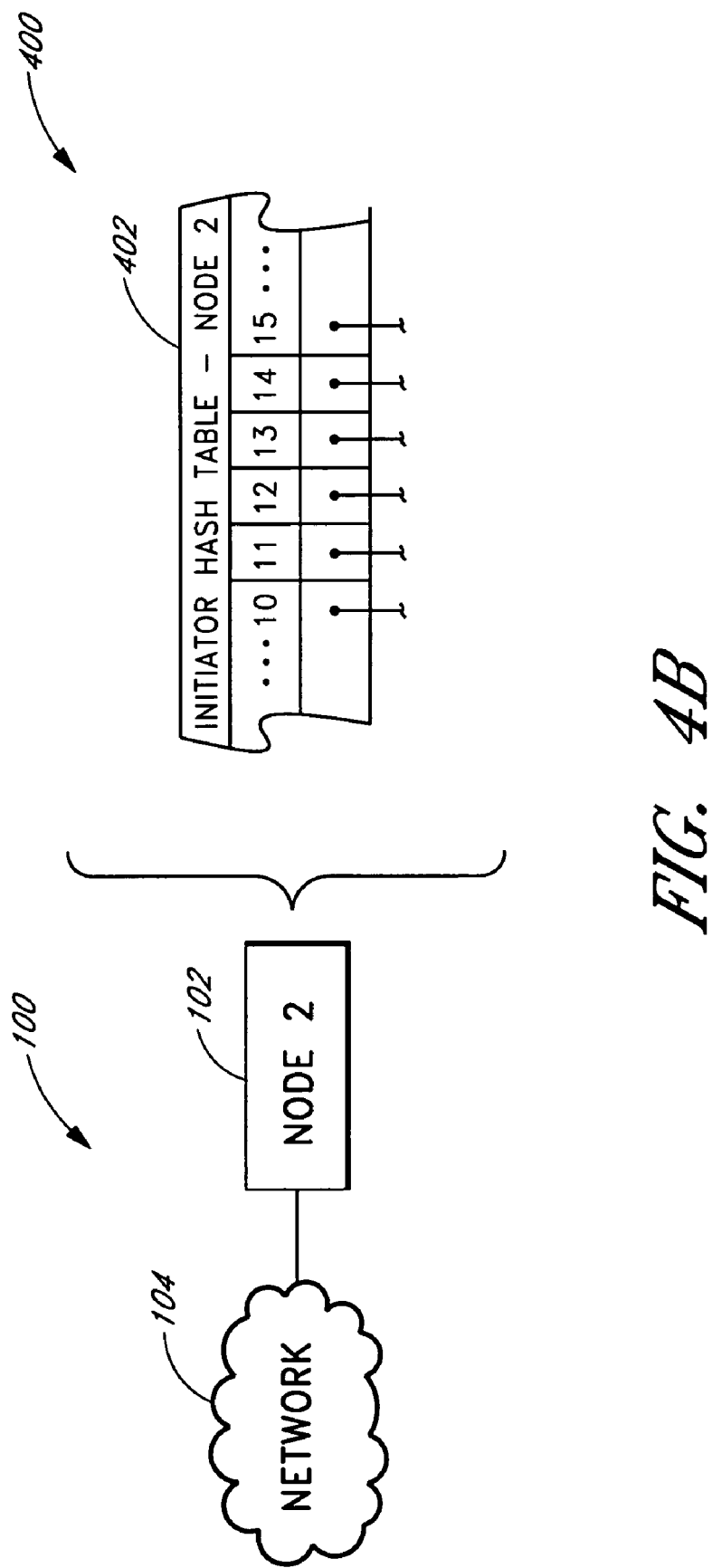
Figure 4C:
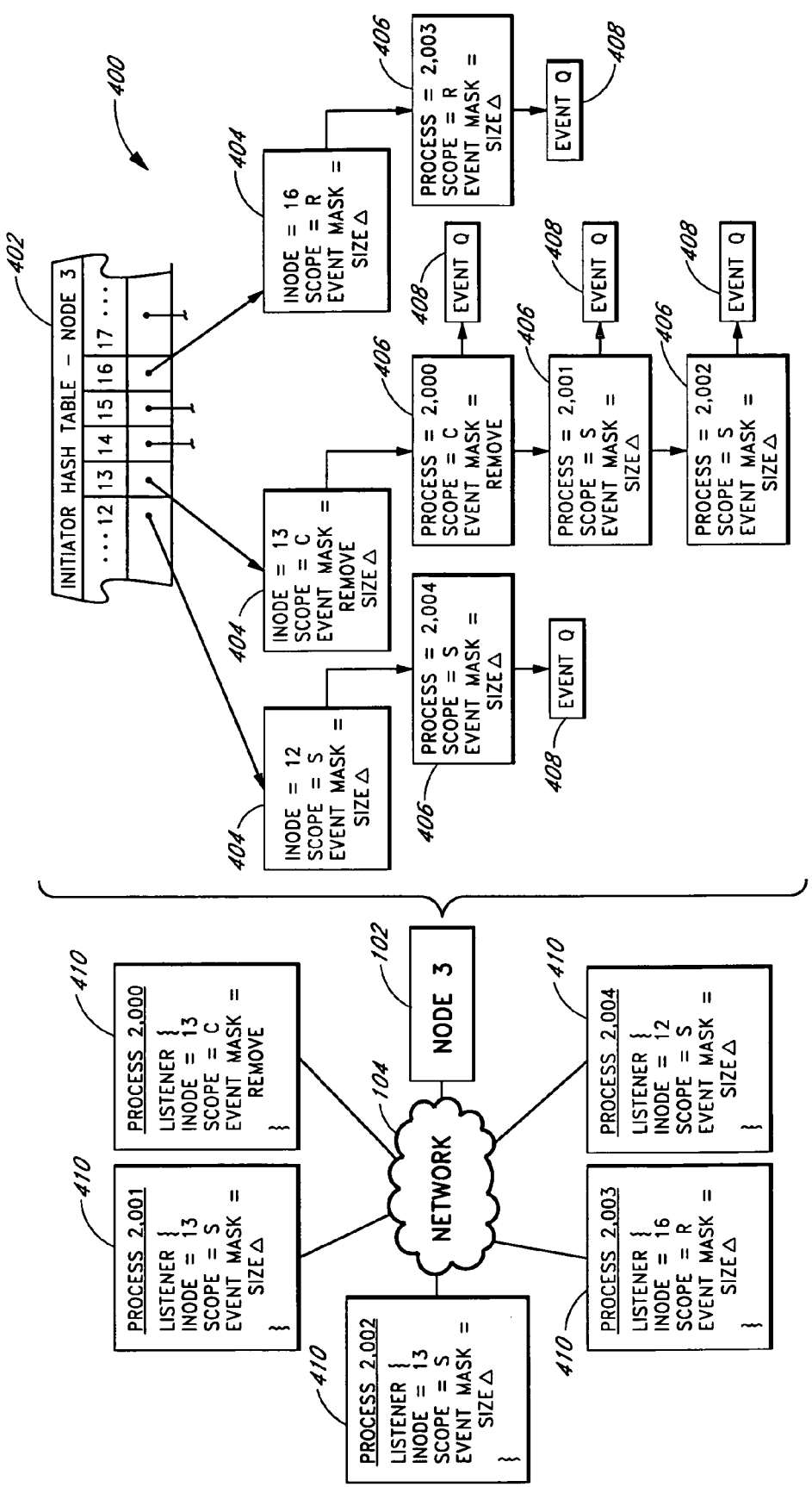

FIGS. 4A, 4B, and 4C illustrate one embodiment of the initiator data structures for each node 102 in the cluster 108. In general, the initiator module receives requests from processes to instantiate certain listeners. In the exemplary embodiment, a listener is defined by a three-element tuple comprising an identifier for the listening inode, (for example, the inode's LIN), the listener's scope, and the list of the type of events to be listened for. The listening inode is the inode to which the listener is directed. As explained above with reference to FIGS. 3B and 3C, a single listener may listen for events to more than just one inode. Therefore, the listening inode is the point of reference from which to calculate the scope of the listener. For instance, with respect again to FIG. 3C, if the listening inode is inode 12 and the scope is recursive, then the listener listens for events that occur on inode 12 and its descendents, inodes 13, 14, 15, 16, 17, 18, 19, 20, and 21. If, alternatively, the listening inode is 18 and the scope is similarly recursive, then the listener listens for events that occur on inode 18 and its lone descendent, inode 21. In one embodiment, listeners may not listen for every event, choosing instead to filter the events they listen for with a list of listening events, collectively referred to as an event mask. It is recognized that in other embodiments, other points of reference, scopes, and event masks may be used.

In addition to receiving requests for listeners, the initiator module also stores the requested listeners in a hash table, also referred to as the initiator hash table, and sends messages to participant modules regarding additions, deletions, and/or changes to the listeners stored in its hash table. This is discussed in more detail with reference to FIG. 7. In one embodiment, the nodes 102 of the cluster 108 include an initiator hash table. As discussed in more detail below with reference to FIG. 4B, the hash table may not include any listeners. The initiator module also communicates the contents of its hash table to the participant modules when a new node 102 is added to the cluster 108. (This is discussed in more detail below with reference to FIG. 17.) In other embodiments, the initiator module may also communicate the contents of its hash table to the participant modules when a node 102 is removed from the cluster. The initiator module may also be configured to receive event messages from participant modules, signifying that the participant node has processed an event that affects an inode for which the initiator node is listening. The initiator module determines from these event messages which, if any, listeners are listening for the event. The initiator module queues those events for which listeners are listening and notifies the listening process of the event. In some embodiments, an event message arrives at an initiator module even though there are no listeners in the initiator's hash table listening for that event. Receiving event messages is discussed in more detail below with reference to FIG. 16.

The initiator hash table 400 includes an index 402, initiator structures 404, process structures 406, and event queues 408. As mentioned above, in the illustrated embodiment, there is one initiator hash table 400 per node 102. In the illustrated embodiment, the initiator hash table 400 maps the LINs of listening inodes to initiator structures 404. As mentioned above, in the illustrated embodiment, a listening inode is the inode to which a listener is directed. The LIN is the key for the initiator hash table 400. The respective LIN is put through a hash function which maps it to another number. That number is then divided by the size of the table, and the remainder is then used as the index into an array of linked list heads or buckets. The buckets hold or point to the initiator structures 404. If multiple LINs hash to the same bucket, then there are multiple initiator structures 404 held in that bucket. Although in the illustrated embodiment a standard hash table is used to map the LIN of a listening inode to an initiator structure 404, there are many suitable data structures that may be used, including without limitation an: array, skip list, rediblack tree, btree, splay tree, AVL tree, and so forth.

Structures are collections of associated data elements, such as a group or set of variables or parameters. In one embodiment, a structure may be implemented as a C-language "struct." One skilled in the art will appreciate that many suitable data structures may be used. As described above, the initiator hash table 400 maps the LINs of listening inodes to initiator structures 404. In the illustrated embodiment, the initiator structure 404 stores the composite scope and event mask of the listeners (initiated on the initiator node) that listen to the respective listening inode. The initiator structure 404 includes a field for the LIN of the respective listening inode, the composite scope of the listeners listening to the listening inode, and the composite event mask of the listeners listening to the listening inode. In one embodiment, the composite scope is the broadest scope of those listeners listening to the listening inode, and the composite event mask is the union of the event masks of the listeners listening to the listening inode.

In the illustrated embodiment, the process structures 406 represent the individual listeners initiated by the initiator. The process structures 406 correspond to associated listening processes 410, which request individual listeners. As used herein, listening processes may refer both to the listening processes 410 and, at other times, to the corresponding process structures 406. In the illustrated embodiment, the process structures 406 include three fields. The first field is a process identifier, which uniquely identifies a process in data communication with the node 102 that has requested a listener on the listening inode. The second field is the scope of the listener that the respective listening process 410 requests for the listening inode. As mentioned with reference to FIGS. 3A, 3B, and 3C above, in the illustrated embodiment, listening scope may be one of three scopes: single, children, or recursive. In the illustrated embodiment, S denotes single listeners, C denotes children listeners, and R denotes recursive listeners. The third field is the event mask of the listener that the respective listening process 410 requests for the listening inode. The listened-for events may include, without limitation, attribute change, creation, deletion, size change, remove, content change, sizing increase, attribute change, link count change, rename, access revoke, create, rename from here, rename to here, rename within same directory, event occurred on file, event occurred on directory, size change, permission change, and/or other events. The event mask is a list of all the events the listener is listening for.

In the illustrated embodiment, the process structures 406 are associated with respective event queues 408. The event queues 408 store event messages from participants. Event messages include information regarding events on inodes within an inode tree, such as inode tree 300, that fall within the scope and event mask of the listener. Event messages are stored in the event queues 408 until a process is ready to process the event.

FIG. 4A illustrates an exemplary initiator hash table 400 on Node 1. As illustrated, there are two listening processes 410 that have requested listeners on a particular inode. In the case of Node 1, the listening processes 410 have requested listeners on the same inode, inode 12. Process 3000 has requested notification of all "create" events on inode 12 and the descendents of inode 12. In other words, Process 3000 has requested a listener on inode 12 with recursive scope and an event mask of "create." Process 3001 has requested notification of all "size change" events on inode 12 and its immediate descendents, or children. In other words, Process 3001 has requested a listener on inode 12 with children scope and an event mask of "size change." It will be appreciated that there are many different ways in which listening processes 410 may communicate listening parameters to nodes 102. In some embodiments, listening processes 410 may communicate listening parameters via a system call, subroutine call, etc.

In the illustrated embodiment, for the listening processes 410, there is a corresponding process structure 406 in the initiator hash table 400 of a node 102, for example Node 1. In the illustrated embodiment, the two listening processes 410, Processes 3000 and 3001, have corresponding process structures 406 stored on Node 1. As illustrated, the respective scopes and event masks of the process structures 406 match the respective scopes and event masks of listening processes 410. In the illustrated embodiment, listening processes 410 specify the point-of-reference inode (the listening inode), and process structures 406 include a field with a unique identifier for the respective listening process 410 that requested the listener.

Initiator structures 404 store global parameters for process structures 406 for respective inodes. Thus, the scope of a given initiator structure 404 is the broadest scope of any of the process structures 406 listening to the respective listening inode, which, in the case of inode 12 on Node 1, is recursive. The event mask of a given initiator structure 404 is a composite, for example, the union, of the event masks of the process structures 406 listening to the respective listening inode. The initiator structures 404 are indexed by the LIN of the listening inode in the initiator hash table index 402. In the illustrated embodiment, the only listeners that have been instantiated on Node 1 are the two listeners on inode 12. Therefore, there is only one corresponding initiator structure 404. The remaining entries in the initiator hash table 400 are empty.

FIG. 4B illustrates one embodiment of the initiator hash table 400 for Node 2. Because there are no processes requesting listeners through the network 104 on Node 2, there are no initiator structures 404. Thus, the initiator hash table 400 is initialized, but the entries in the hash table 400 are empty. In other embodiments, the initiator hast table 400 is not initialized until there are initiator structures 404.

FIG. 4C illustrates the initiator hash table 400 for Node 3. In the illustrated embodiment, there are five processes requesting listeners. Three of the listening processes 410 specify inode 13 as the inode to which they are listening. The remaining two listening processes 410 specify inodes 12 and 16, respectively, as the inodes to which they are listening. Processes 2000, 2001, and 2002 all request listeners on inode 13. Process 2003 requests a listener on inode 16. Finally, Process 2004 requests a listener on inode 12. Because the five processes collectively request listeners on three different inodes, there are three initiator structures 404, corresponding to each one of the specified listening inodes. These initiator structures 404 are indexed by their respective LINs. The five listening processes 410 have a corresponding process structure 406 in the initiator hash table 400 for Node 3. Because three of the listening processes 410 request listeners for inode 13, there are three process structures 406 linked to the initiator structure 404 corresponding to inode 13. Thus, there is a separate process structure 406 for Processes 2000, 2001, and 2002. These process structures 406 have different scopes and event masks, corresponding to the individual scope and event mask specified by the corresponding listening process. Thus, the process structure 406 corresponding to Process 2000 listens to every "remove" event on inode 13 and its immediate children inodes. The process structure 406 corresponding to Process 2001 listens to every "size change" event on inode 13. Identically, the process structure 406 listens to every "size change" event on inode 13.

Process 2004 requests a listener on inode 12. This listener listens for "size change" events on inode 12. Because there is only one process structure 406 for inode 12, the initiator structure 404 corresponding to inode 12 matches the process structure 406 for Process 2004, with respect to the scope and the event mask. Process 2003 requests a listener for inode 16. The listener listens for "size change" events on inode 16 and its descendents. Similar to the initiator structure 404 for inode 12, the initiator structure 404 for inode 16 matches the process structure 406.

As described above with reference to FIG. 4A, the process structures 406 have corresponding event queues 408. When events occur within the scope and event mask of the listener, the events or the messages about the events are queued in the event queue 408 of the corresponding process structure 406.

B. Participant Data Structures

Figure 5:
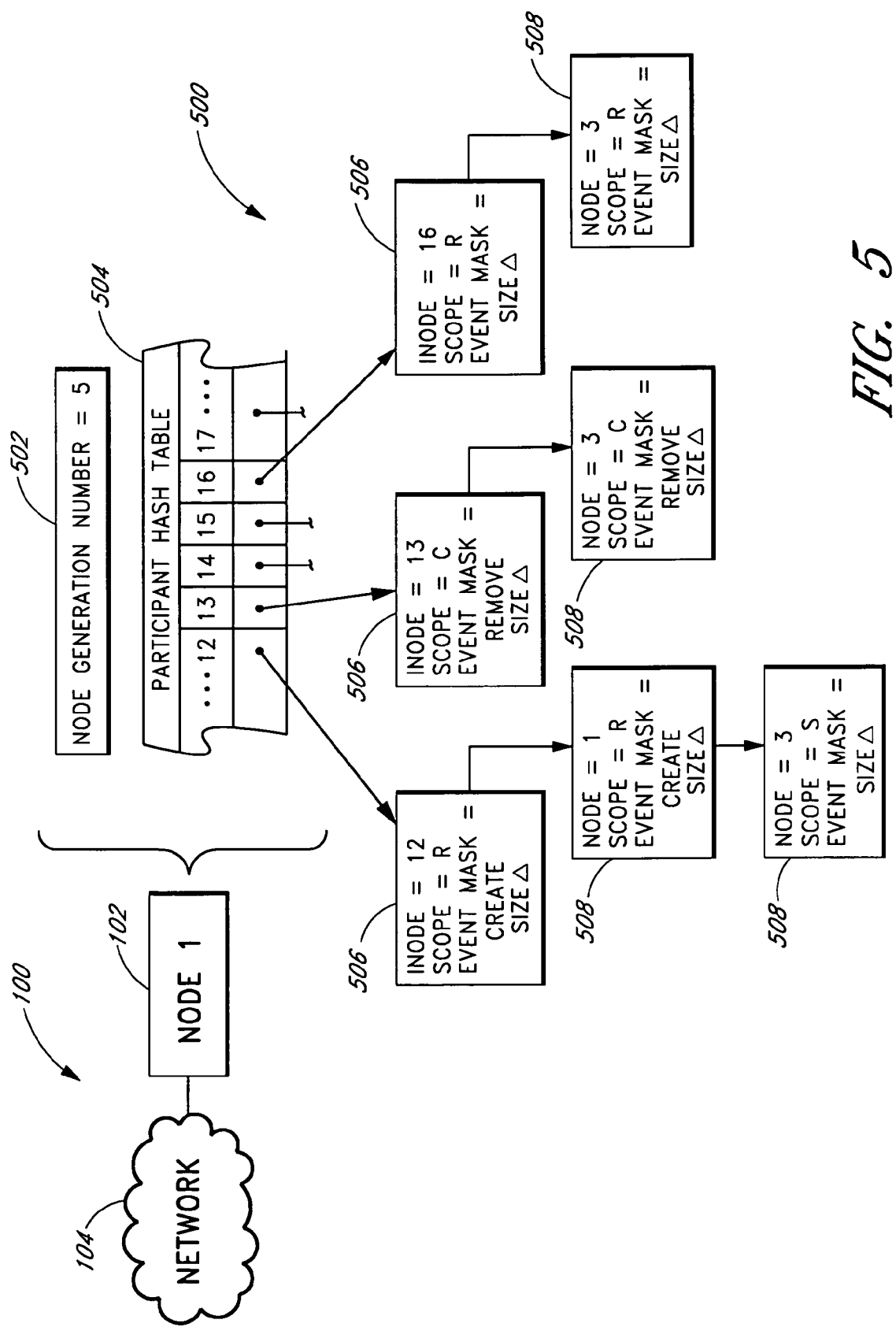
FIG. 5 illustrates one embodiment of a participant hash table.

FIG. 5 illustrates one embodiment of the participant data structures. In the exemplary embodiment, participant data structures include a participant hash table 500 and a node generation number 502. In the exemplary embodiment, there are listeners listening to three different inodes. These inodes are 12, 13, and 16, respectively. The node structures 508 indicate the composite scope and event masks for all of the listeners for a particular listening inode initiated on a particular node 102. The scope and event masks of the node structures 508 correspond to the initiator structures 404 for the respective listening inode. By way of example, the node structure 508 for Node 1 that is associated with inode 12 corresponds to the initiator structure 404 for Node I that is associated with inode 12, as illustrated in FIG. 4A. In the illustrated embodiment, there are listeners for inode 12 that were initiated by both Nodes 1 and 3. In other words, certain listening processes 410 communicated to Nodes 1 and 3, respectively, the parameters for process structures 406 for inode 12. Each node structure 508 may represent multiple listeners, just as initiator structures 404 represented multiple listeners. For instance, the node structure 508 for inode 13 represents the three listeners initiated on Node 3, corresponding to Processes 2000, 2001, and 2002 and their respective process structures 406.

In the illustrated embodiment, the participant structure 506 represents the composite scope and event masks of the node structures 508 corresponding to the respective listening inodes in the participant hash table 500. For example, the participant structure 506 corresponding to inode 12 includes a composite scope and composite event mask representing those listeners for inode 12 that are initiated, in this embodiment, on all of the nodes 102. Thus, the scope of the participant structure 506 corresponding to inode 12 is recursive, indicating the broadest scope of the two node structures 508 corresponding to inode 12. The event mask for participant structure 506 corresponding to inode 12 includes the "create" and "size change" events, which is the union of the event masks of node structure 508 for Node 1 and of node structure 508 for Node 3. Each participant structure 506 is indexed in the participant hash table index 504 by the LIN of the respective listening inode. Because the node structures 508 corresponding to listening inodes 13 and 16, respectively, are the only node structures 508 for their respective listening inodes, the respective participant structures 506 have the same scope and event mask as their respective node structures 508.

In the illustrated embodiment, the participant hash table 500 is the same for Nodes 1, 2, and 3. The purpose of the participant structures is to process events that may occur on any given inode in the distributed file system, and that may occur, for instance, on any one of the nodes 102 in the cluster 108. It is recognized that in some embodiments one or more of the participant hash tables may be different.

In the illustrated embodiment, the participant data structures also include a node generation number 502. The node generation number 502 is used to verify that a particular inode's cache is up-to-date, as discussed further below with reference to FIGS. 8A and 8B. The node generation number 502 may be incremented every time there is a significant change to the participant hash table 500. Changes to the participant hash tables 500 correspond to changes to the respective initiator hash tables 400. The node generation number 502 for each respective node 102, however, need not be the same. Because nodes 102 that may have been disconnected from the cluster 108 may not have been involved during a change to the participant hash tables 500 of the other nodes 102, the generation numbers for the nodes 102 may be different. The participant hash tables 500, however, are the same on every node 102.

Figure 6B:
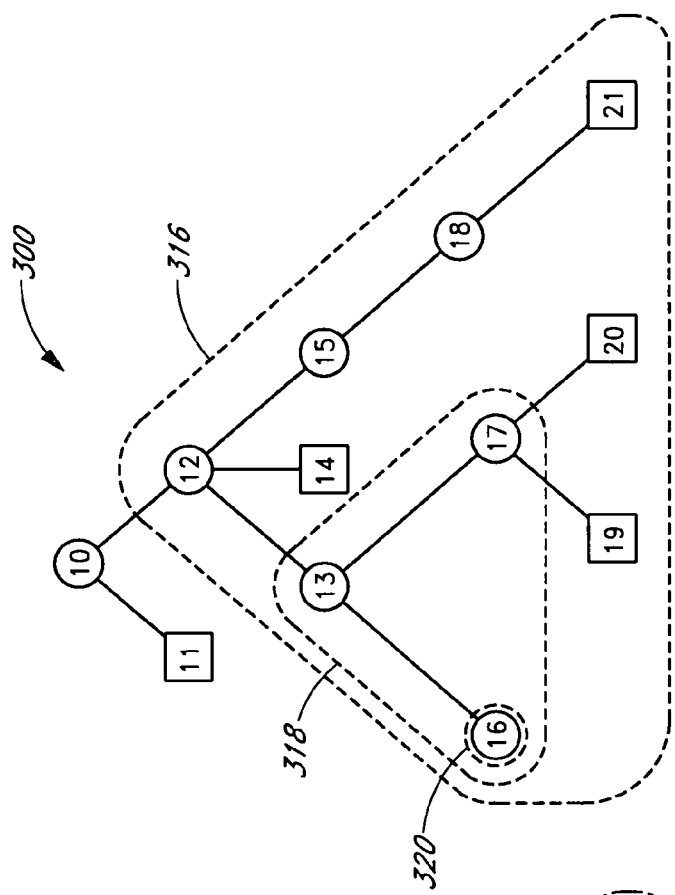
FIGS. 6A and 6B illustrate one embodiment of the scope of listeners from the perspective of processes and nodes, respectively.
Figure 6A:
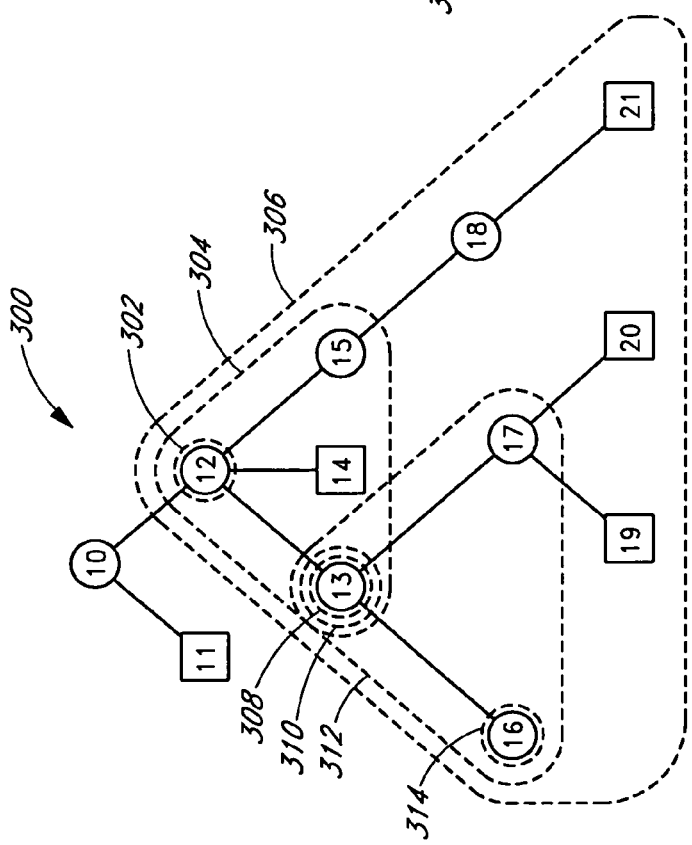

FIGS. 6A and 6B illustrate one embodiment of the different perspectives of listening scope. FIG. 6A illustrates the scope of listeners from the perspective of each individual process. FIG. 6B illustrates the scope of listeners with respect to the participant structures 506 in the participant hash tables 500. The listeners illustrated in FIGS. 6A and 6B correspond to the listeners described in FIGS. 4A, 4B, 4C, and 5. FIG. 6B illustrates the listeners from the perspective of each process that has requested a listener on one of the inodes in the inode tree 300.

There are seven listeners represented in FIG. 6A. A listener with single scope 302 is attached to inode 12. Additionally, there is a listener with children scope 304 attached to inode 12. Finally, there is a listener with recursive scope 306 attached to inode 12. These three listeners correspond to the three listeners requested for inode 12, as illustrated in FIGS. 4A and 4C. Thus, FIG. 4A illustrates two processes, Processes 3000 and 3001, which are listening to inode 12. The recursive listening scope 306 corresponds to the listener requested by Process 3000, which has a recursive scope. Similarly, the children listening scope 304 corresponds to the listener requested by Process 3001, which also has a scope of children. Finally, the single listening scope 302 corresponds to the listener requested by Process 2004, as illustrated in FIG. 4C, which is a single listener attached to inode 12.

Figure 16:
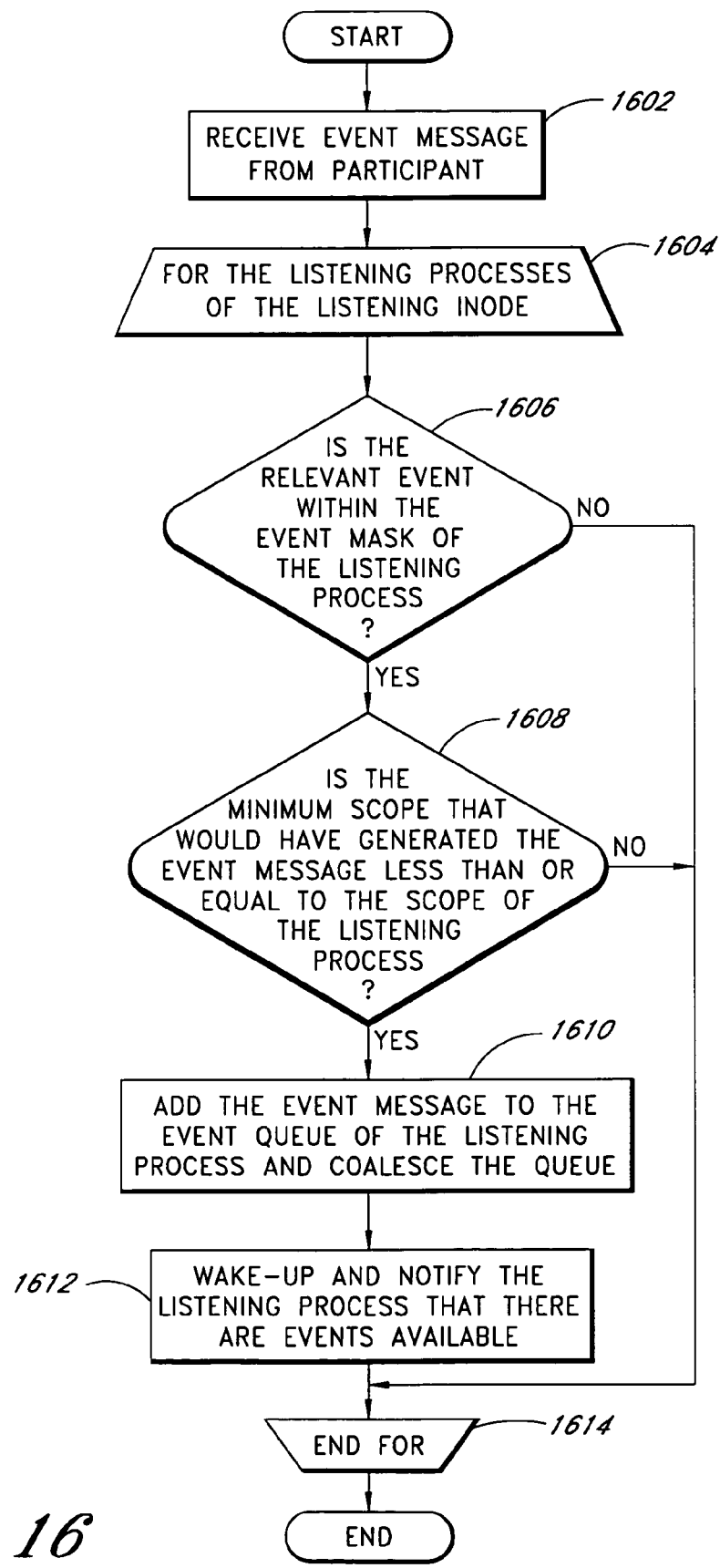
FIG. 16 illustrates one embodiment of a flowchart of operations of the initiator module to receive an event message and to notify listening processes accordingly.

As illustrated in FIG. 6A, there are three listening scopes for inode 13. Two of these listening scopes are single scope 308 and 310, and the last listening scope is a children scope 312. These three listening scopes correspond to the three listeners illustrated in FIG. 4C. Thus, Process 2000 requests a listener for inode 13 with children scope, which corresponds to children listening scope 312. Processes 2001 and 2002 request listeners on inode 13, each with single scope, which correspond to single listening scopes 308 and 310. Finally, as illustrated in FIG. 6, inode 16 has a listening scope 314 attached to it, which corresponds to the listener requested by Process 2003. Although the scope of the listener attached to inode 16 as illustrated in FIG. 16 appears to be a single listener, it is in fact a recursive listener. Because the inode 16 has no descendents, the recursive listener appears as if it were a single listener.

FIG. 6B illustrates the same set of listeners whose scope is illustrated in FIG. 6A, but does so from the perspective of the participant structures 506. The three scopes illustrated in FIG. 6B correspond to the three scopes of the participant structures 506, as illustrated in FIG. 5. In one embodiment, these scopes may typically be different than the scopes of the initiator structures 404 on the initiator hash tables 400, even though in the exemplary embodiment they are the same. Thus, there is a recursive listening scope 316 defined for inode 12, a children listening scope defined for inode 13, and a single listening scope defined for inode 16. These scopes do not necessarily represent individual listeners, but rather represent the scope of the listeners for each particular listening inode across all nodes 102. Thus, FIG. 6B illustrates the composite scope of the listeners for a particular listening inode. There are three scopes defined, corresponding to the three inodes, as illustrated in FIG. 5, with listeners attached to them. Thus, the scope defined for inode 12 represents the composite scope of the listeners attached to inode 12 across all the nodes 102. Because the scope of one of the listeners attached to inode 12 is recursive, the composite scope for inode 12 is recursive, the recursive scope 316. In other words, the scopes in FIG. 6B describe the broadest scope of any one of the listeners for a particular listening inode. The broadest scope of any listener attached to inode 13 is children. For this reason, the listening scope for inode 13 is the children scope 318. The scope for the listeners attached to inode 16 does not appear to extend beyond inode 16. Although this appears to be a single listening scope, in fact, it is recursive listening scope 320, corresponding to the listener requested by Process 2003, which specifies recursive scope.

C. Update Process

As mentioned above with respect to FIG. 5, in one embodiment, the initiator hash tables 400 and the participant hash tables 500 are updated when a change, or a certain type of change, is made to the set of listeners. For example, a listening process 410 may terminate and no longer require listeners. Alternatively, in some embodiments, the scope or event mask of a previously initiated listener may be altered. Thus, in one embodiment, there may be a need to update on a consistent basis the initiator hash tables 400 and the participant hash tables 500.

Figure 7:
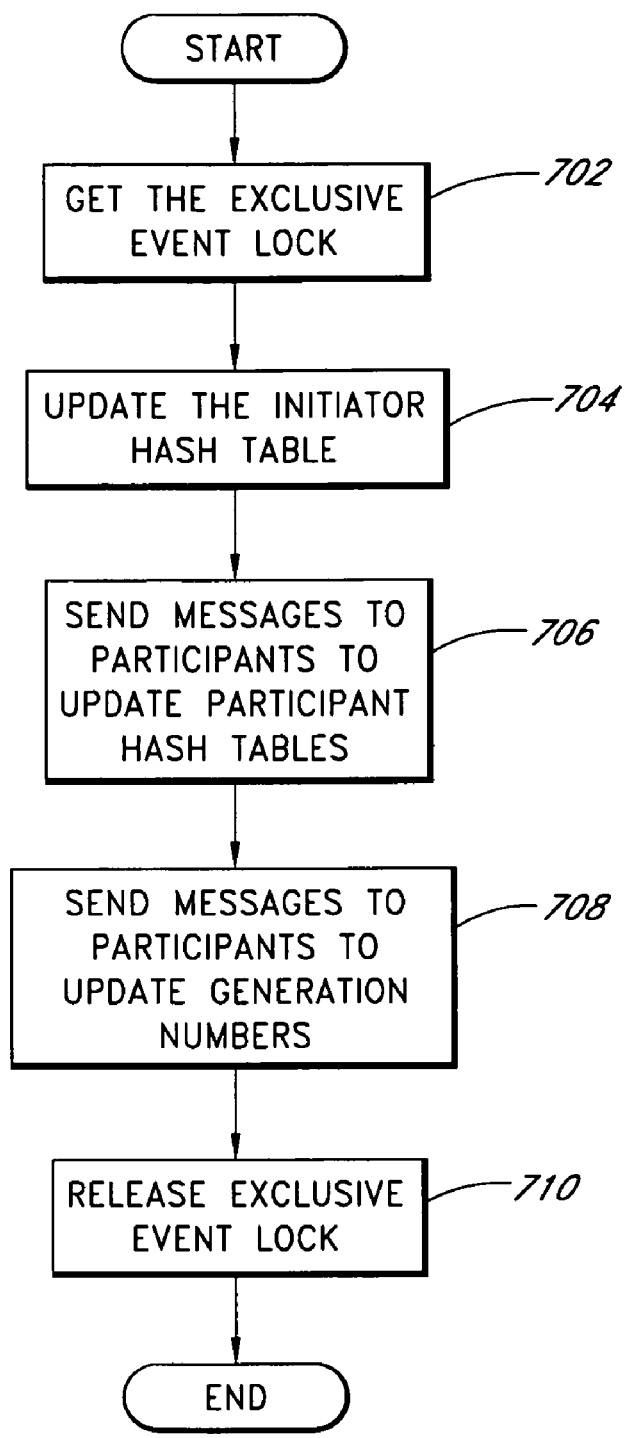
FIG. 7 illustrates one embodiment of a flowchart of operations to add an additional listener to an embodiment of the system.

FIG. 7 illustrates one embodiment of a flowchart for the operations to update the initiator hash tables 400 and the participant hash tables 500. In state 702, the node 102 receiving the request for a change to one of the listeners, including adding or deleting a listener, gets the exclusive event lock. In one embodiment of a distributed system, an exclusive event lock prevents other nodes 102 from reading from or writing to the distributed system. In the illustrated embodiment of the event system, an exclusive event lock is obtained in order to prevent other nodes from reading or writing to the initiator hash tables 400 or the participant hash tables 500 during the update. As described below with reference to FIG. 9, the illustrated embodiment also implements a shared event lock, which prevents other nodes 102 from gaining access to an exclusive event lock. In other embodiments, a locking scheme may be used that is finer grained.

In state 704, an initiator process for the node 102 updates its respective initiator hash table 400 corresponding to the node 102. As used with reference to FIG. 7, the initiator process describes an executable portion of the initiator module. Although in the illustrated embodiment, the operations described in FIG. 7 are executed by the initiator module, in other embodiments, the same operations may be executed by other modules, such as the participant module.

Once the respective initiator hash table 400 has been updated, the initiator process sends messages to the participant modules signifying that there has been an update to an initiator hash table 400, and subsequently delivers the updated information for its hash table 400, which is described in state 706. As mentioned above, in the illustrated embodiment of the invention, the nodes 102 include both an initiator and a participant module. The participants update their participant hash tables 500. In one embodiment, to update the participant hash table 500, a participant process, which may include an executable portion of the participant module, indexes the appropriate listening inode. If necessary, changes are made to the node structures 508 and the corresponding participant structures 506, to represent the updated listener information. Once the participant hash tables 500 have been updated, the participant process increments the node generation number 502 in state 708. In some embodiments, the node generation number 502 is simply incremented. In other embodiments, the node generation number 502 may correspond to some other identifier that participant nodes recognize as the updated status of the participant hash tables 500. In state 710, the respective initiator process releases the exclusive event lock. As described above, in one embodiment, the initiator process described in FIG. 7 pertains to the initiator module and the participant process pertains to the participant module. In other embodiments, the initiator process and/or the participant process reside in other and/or additional modules.

D. Example Change to Listeners

FIGS. 8A and 8B illustrate one embodiment of a change to the listeners of the inode tree 300. FIG. 8A illustrates the state of the inode tree 300 before Processes 3000 and 3001, illustrated in FIG. 4A, have requested listeners on inode 12. Thus, FIG. 8A illustrates one embodiment of the state of the inode tree 300 with listeners requested by Processes 2000, 2001, 2002, 2003, and 2004. Only three scopes are illustrated because two of the listeners fall within the scope of another listener. Specifically, the single scope listeners requested by Processes 2001 and 2002 fall within the scope of the children scope listener requested by Process 2000. It is important to note, however, that, in the exemplary embodiment, the overall scope does not define the scope for particular events. Thus, even though the Process 2000 listens only for "remove" events and Processes 2001 and 2002 listen only for "size change" events, these three listeners are represented by only one scope, which is the children scope because it is the broadest scope.

Figure 8:
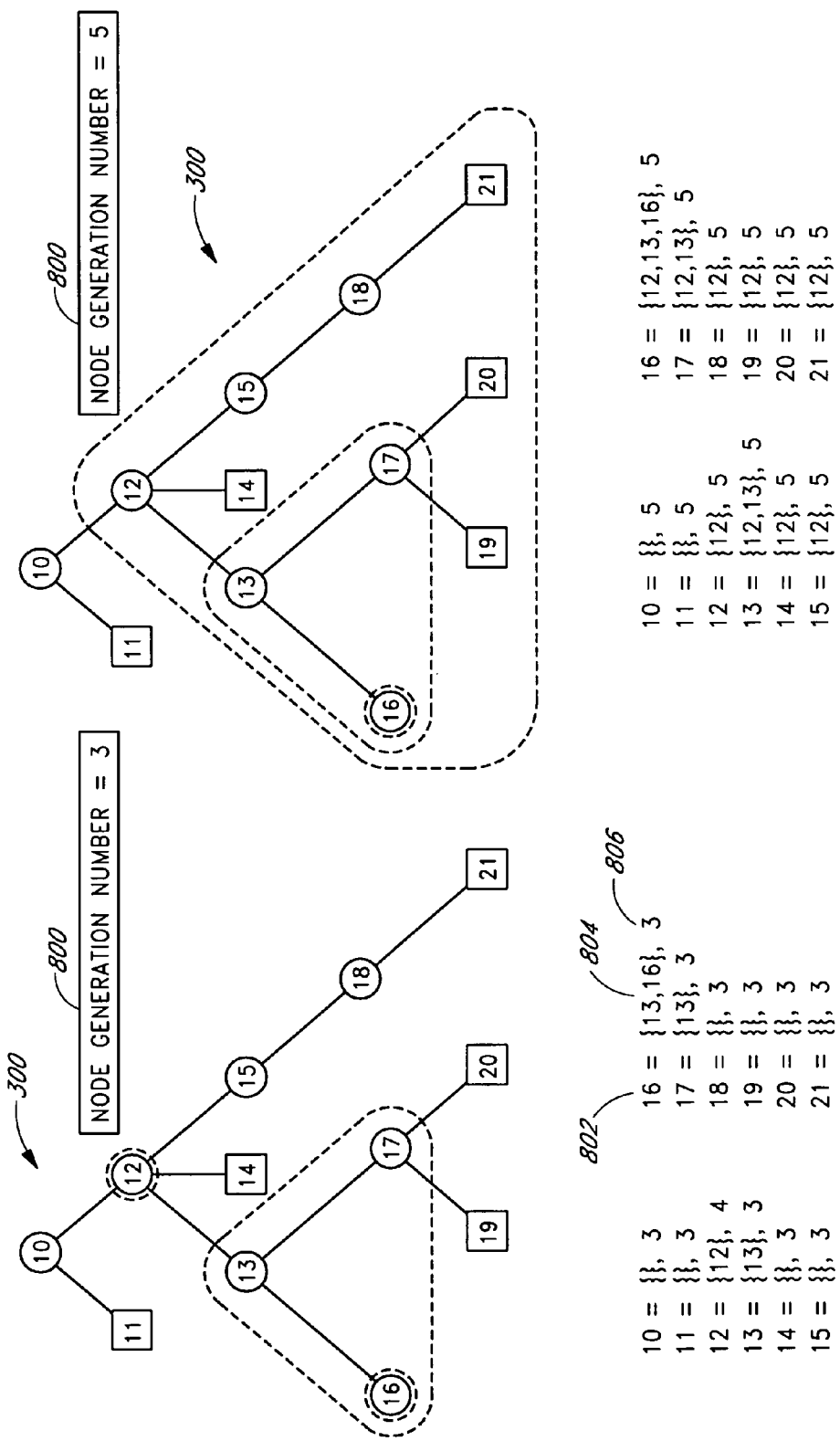
FIGS. 8A and 8B illustrate one embodiment of the scope of exemplary listeners (from the perspective of nodes) following the addition of another listener.

As discussed in greater detail below with reference to FIGS. 8, and 10 through 12, in one embodiment, each individual inode includes an event cache. (See also the description of FIG. 2 above.) The event cache includes a listening set 804 and a cache generation number 806. The listening set 804 of a particular inode includes the LINs of the listening inodes (in the participant hash tables 500) whose scope encompasses that particular inode. For example, with respect to inode 16, the listening set 804, as illustrated in FIG. 8A, includes listening inodes 13 and 16. This means that there is a listener associated with inode 13 whose scope is broad enough to include inode 16. Similarly, there is a listener associated with inode 16 whose scope is broad enough to include inode 16, namely, the listener associated with inode 16.

In addition to the listening set 804, each inode cache includes a cache generation number 806. If the cache generation number 806 of an inode matches the node generation number 502, then the event cache of the inode is up-to-date. FIG. 8A illustrates an inode tree 300 wherein the event cache of every inode is up-to-date. The event caches are up-to-date because each cache generation number 806 matches the node generation number 502.

FIG. 8B illustrates one embodiment of the state of the inode tree 300 following the addition of two additional listeners. In the exemplary embodiment, these listeners correspond to the listeners requested by Processes 3000 and 3001, as illustrated in FIG. 4A. When Process 3000 requests a listener on inode 12, the broadest scope on inode 12 becomes the recursive scope. The only listener previously attached to inode 12 is the listener requested by Process 2004, which has single scope. The broadest scope of a listener on inode 12, following the addition of the listener corresponding to Process 2004, is the recursive scope, as illustrated in FIG. 8B. This scope corresponds to the scope of the participant structure 506 corresponding to inode 12 following the addition of the listener corresponding to Process 2004. When Process 3001 attaches an additional listener of children scope to inode 12, the broadest scope does not change because the children scope is less than or equal to the previous scope, recursive.

In the exemplary embodiment, the addition of each listener, first 3000 and then 3001, caused the node generation number 502 to increment by one (not illustrated). In some embodiments, successive changes to the listeners may be grouped together. One skilled in the art will appreciate that there are many possible ways to and times to adjust the node generation number 502 to reflect the change in the status of listeners. FIG. 8B also illustrates how up-to-date event caches would appear following the addition of the two listeners.

Thus, with respect to inode 16, the listening set is 12, 13, and 16. This means that there are listeners attached to inodes 12, 13, and 16 whose scope is broad enough to include inode 16. Inode 16 is within the scope of listening inode 12 because the broadest listener attached to inode 12 is a recursive listener. Inode 16 is within the scope of listening inode 13 because the broadest scope of a listener attached to inode 13 is the children scope and inode 16 is an immediate descendent, or child, of inode 13. Finally, inode 16 is within the scope of listening inode 16 because inode 16 is inode 16; thus, inode 16 is within the scope of any listener attached to inode 16 because even the smallest scope, in the exemplary embodiment the single scope, includes the inode itself.

In one embodiment, the transition of event caches from FIG. 8A to FIG. 8B does not happen automatically; the event caches of each inode in the inode tree 300 are not updated automatically. Instead, the event caches for each inode are updated as needed. In other embodiments, some or all of the updating is automatic. One embodiment of an updating process is described in detail further below in FIGS. 10 through 12.

E. Processing An Event

Figure 9:
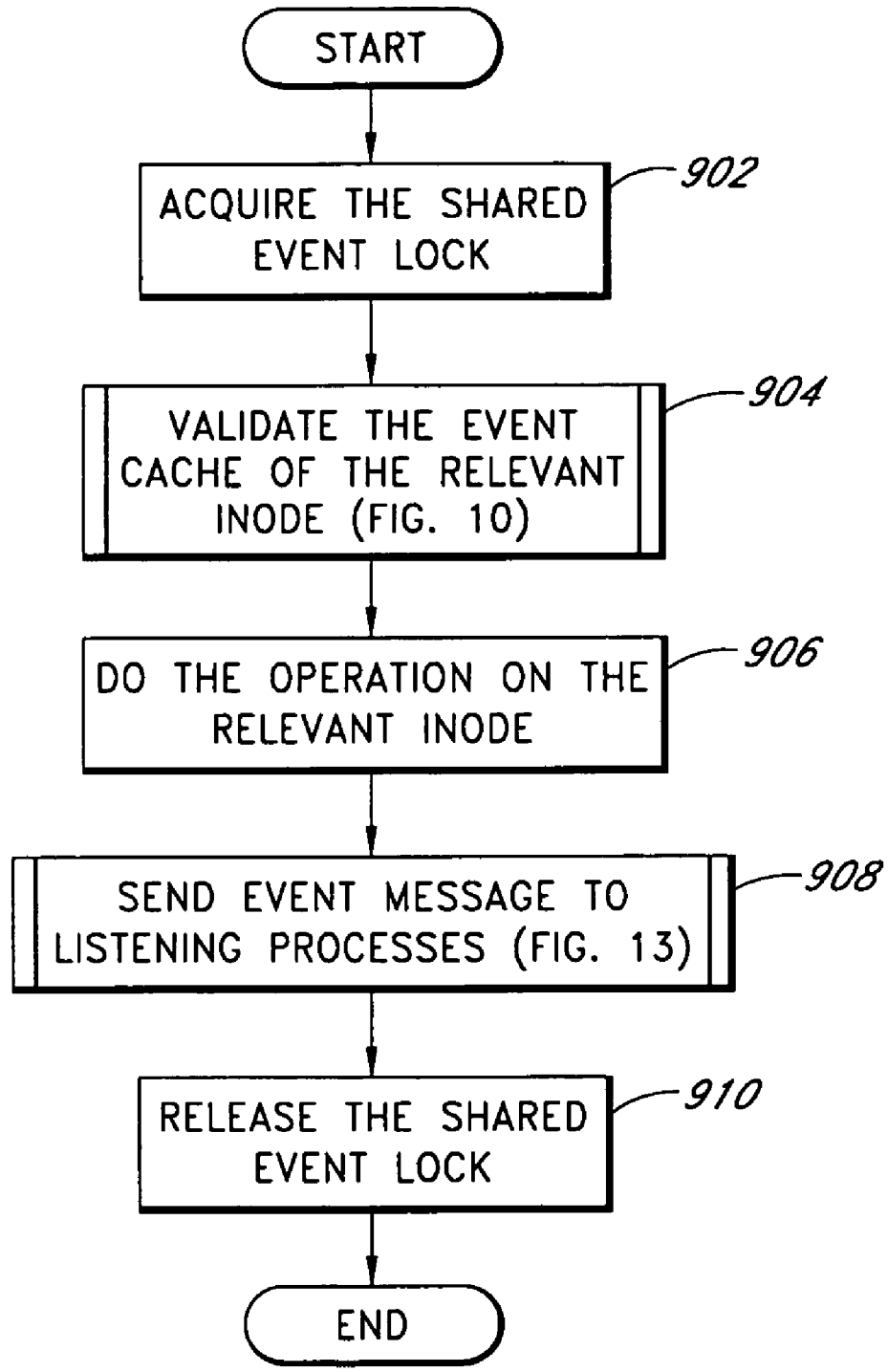
FIG. 9 illustrates one embodiment of a top-level flowchart of operations for notifying listeners of an event in an embodiment of the system.

FIG. 9 illustrates one embodiment of a flowchart of the top-level events for processing an event on the cluster 108. The respective node 102 where the event occurs determines whether event messages are sent to listeners. The execution of operations depicted in FIG. 9 is referred to collectively as the process. In the illustrated embodiment, the initiator module executes the process. In other embodiments, the process may be executed by other modules, such as the participant module. Before the node 102 processes the event, the process decides if the relevant inode, referred to as the inode on which the event occurs, is being listened to. This is one of the functions of one embodiment of an event system described herein, and this function is described in more detail in the third section, with reference to FIGS. 10 through 12. If the relevant inode is being listened to, then the process sends event messages to the corresponding listening nodes, referred to as those nodes listening for events on the relevant inode, and the respective initiators determine whether to place the event message in the event queues 408 of any process structures 406. In one embodiment, this function is the third primary function of the exemplary event system described herein, and it is described in more detail in the fourth section, with reference to FIGS. 13 through 16.

With respect to the flowchart illustrated in FIG. 9 the node 102 on which the event occurs acquires a shared event lock 902. In one embodiment, a shared lock prevents other nodes 102 from obtaining an exclusive event lock. Other nodes 102 may continue to read the contents of the system while one node 102 has the shared event lock. After acquiring the shared event lock, the process validates the event cache of the relevant inode 904. The relevant inode is the inode that the event affects. In one embodiment, the event affects the file or directory corresponding to the relevant inode. Because the data stored in the relevant inode may also change, in some embodiments, the event is referred to as occurring to the inode. Various embodiments of validation of the event cache of the relevant inode are discussed in further detail below with reference to FIG. 10. After validating the event cache of the relevant inode the node 102 executes the operation, in state 906. As mentioned above, with reference to FIGS. 4A, 4B, 4C, and 5, these events may include, without limitation, attribute change, creation, deletion, size change, remove, content change, sizing increase, attribute change, link count change, rename, access revoke, create, rename from here, rename to here, rename within same directory, event occurred on file, event occurred on directory, size change, permission change, and/or other events. After performing the operation on the relevant inode, the node 102 sends event messages to the listeners, in state 908. Various embodiments of this state are described in more detail below with reference to FIGS. 13 through 16. After sending event messages to listeners, the node 102 releases the shared event lock, in state 910. As mentioned above, in one embodiment, the process described by FIG. 9 is executed by the participant module, though in other embodiments, the process may be executed by other modules.

III. Deciding Whether Anyone is Listening to a File

A. Validating An Event Cache

Figure 10:
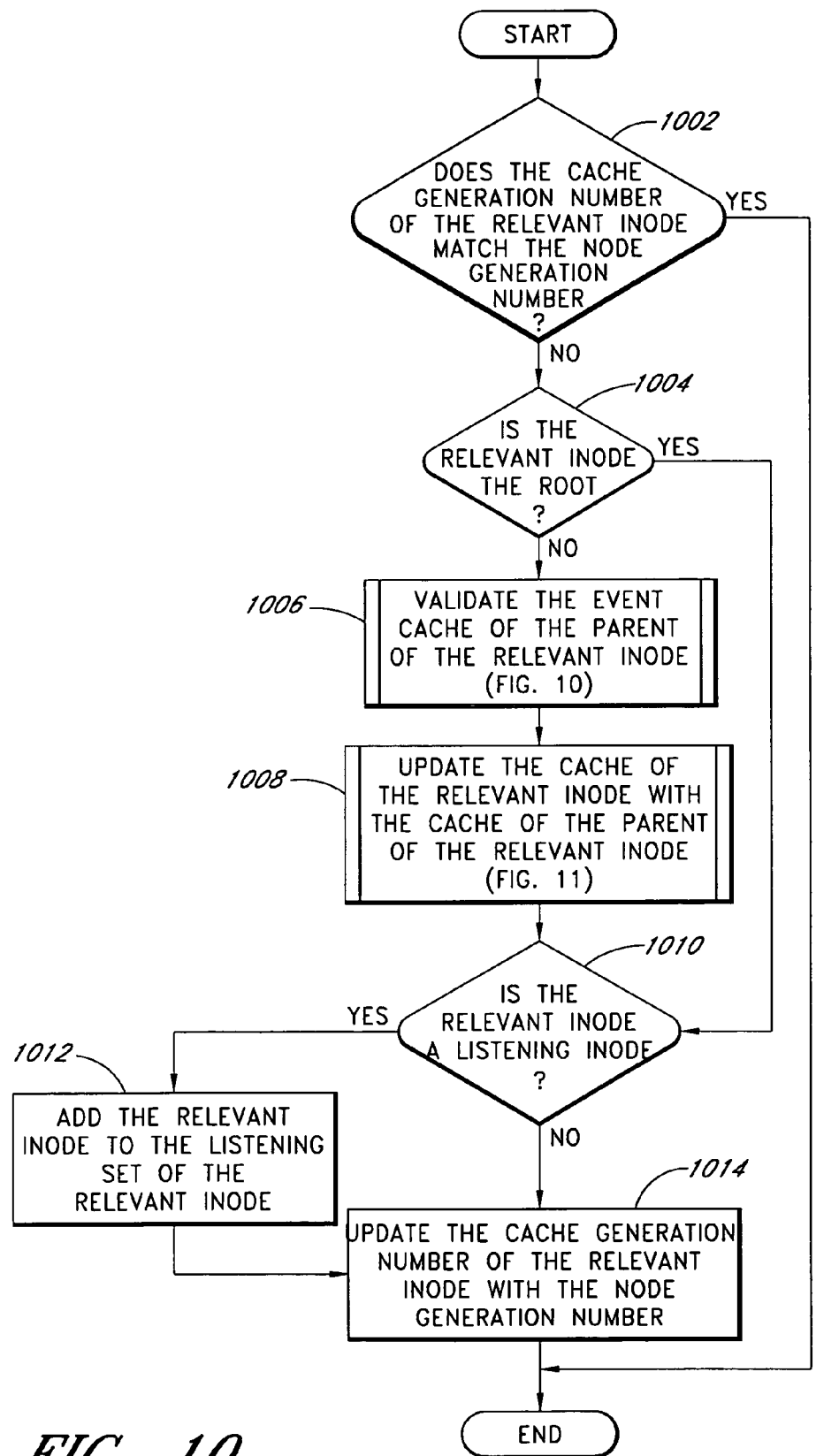
FIG. 10 illustrates one embodiment of a flowchart of operations to validate the event cache of an inode.

FIG. 10 illustrates one embodiment of a flowchart of operations to validate an event cache of a relevant inode. The operations described in FIG. 10 are collectively referred to as the process. In one embodiment, the participant executes the process, though in other embodiments, other modules, such as the initiator module, may execute the process. In state 1002, the process determines if the cache generation number 806 of the relevant inode matches the node generation number 502 of the relevant node. In one embodiment, the relevant node is the node upon which the relevant event occurs, and the relevant event is the current event being processed. If there is a match, then the event cache of the relevant inode is up-to-date and it has been validated. If, on the other hand, the cache generation number 806 of the relevant inode does not match the node generation number 502, then the participant module proceeds to state 1004, and the process determines whether the relevant inode is the root of the inode tree 300. If the relevant inode is the root then participant module proceeds to state 1010, and there is no need to update the cache of the relevant inode with the cache the parent because the root has no parent.

If, on the other hand, the relevant inode is not the root, then the cache of the relevant inode is updated with the cache of the parent. Before doing this, however, the cache of the parent is validated. In other words, in one embodiment, the cache of the relevant inode may not be updated with the cache of the parent until the cache of the parent is up-to-date itself. This step demonstrates the recursive nature of one embodiment of the algorithm. In one embodiment, the recursion occurs all the way until the relevant inode is the root or the relevant inode has a valid cache. (As used during the recursive stage, the relevant inode is the inode being updated, not the inode to which the event originally occurred, as is used in other parts of the description.) Although in general the relevant inode refers to the inode upon which the relevant, or current, event occurs, during the validation stage, the relevant inode refers to whichever inode is being validated. Thus, as the process proceeds up the tree, each inode along the way becomes the relevant inode for purposes of validating the event caches. Once this process is finished, the relevant inode generally refers to the inode to which the relevant, or current, event occurred. Thus, if the relevant inode is not the root then, in state 1006, the participant module proceeds to validate the event cache of the parent, which, with respect to the flowchart depicted in FIG. 10, returns the participant module to state 1002. The process then proceeds through the same flowchart operations, with the parent of the relevant inode of the previous pass becoming the relevant inode for the successive pass. This is the recursive element of one embodiment of the event cache validating algorithm.

After validating the event cache of the parent, the process updates the cache of the relevant inode with the cache of the parent 1008. This is the first operation taken after returning from each successive call to validate the event cache of the "relevant" inode. In one embodiment, "relevant" is relative because as the process works up the tree, the parent of the relevant inode becomes the relevant inode. State 1008 is described in more detail below with reference to FIG. 11. Once the cache of the relevant inode has been updated with the cache of the parent, the process proceeds to state 1010. As set forth above, the process also progresses to state 1010 if it is determined, in state 1004, that the relevant inode is the root. In state 1010, the process determines whether or not the relevant inode is itself a listening inode, by looking, for example, in the participant hash table 500. If the relevant inode indexes a participant structure 506, then it is a listening inode. If the relevant inode is a listening inode, then process proceeds to state 1012. In state 1012, the relevant inode is added to the listening set 802 of the relevant inode. If, on the other hand, the relevant inode is not a listening inode then the process proceeds to state 1014. Similarly, after adding the relevant inode to the listening set 804 of the relevant inode, in state 1012, the process proceeds to state 1014, where the cache generation number 806 of the relevant inode is updated with the current value of the node generation number 502. As described above, in one embodiment, the participant module executes the process, though in other embodiments, other modules, such as the initiator module, may execute the process.

B. Updating The Cache

Figure 11:
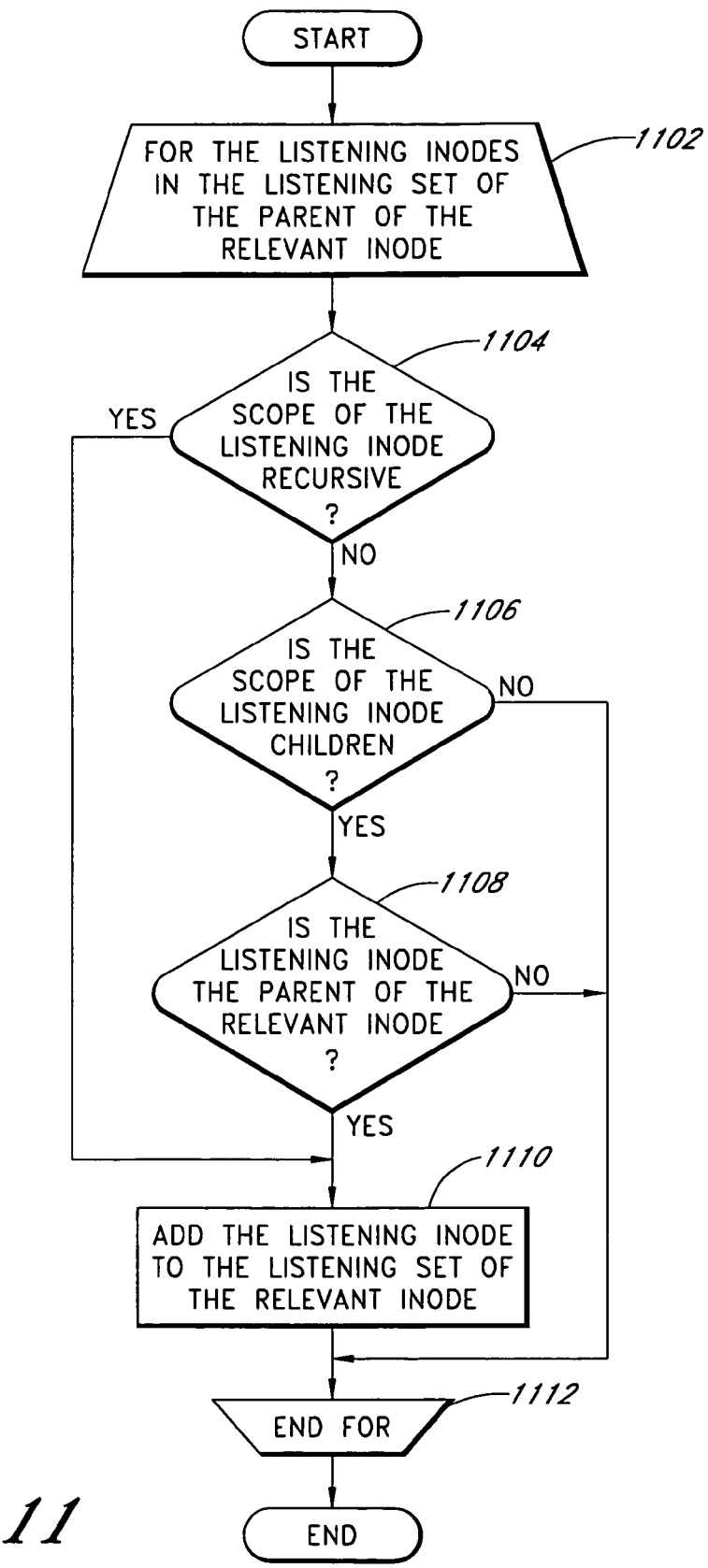
FIG. 11 illustrates one embodiment of a flowchart of operations to update the cache of a child inode with the cache of the parent inode.

FIG. 11 illustrates one embodiment of state 1008 in more detail and illustrates the operations for updating the cache of the relevant inode with the cache of the parent. In one embodiment, the states in between state 1102 and 1112 repeat for each listening inode in the listening set 804 of the parent of the relevant inode. During each loop, the respective listening inode in the listening set 804 is the corresponding listening inode specified in the flowchart. For example, if the listening set 804 of the parent of the relevant inode includes two listening inodes, then the loop would repeat two times.

In state 1104, the process determines whether the scope of the respective listening inode is recursive. If the scope of the respective listening inode is recursive, then the relevant inode is within the scope of the respective listening inode, and the process proceeds to state 1110, where the respective listening inode is added to the listening set 804 of the relevant inode. If, on the other hand, the scope of the respective listening inode is not recursive, then the process determines whether the scope of the listening inode is children 1106. If the scope of the respective listening inode is not children, then the scope of the listening inode is be single, and if the scope of the listening inode is single then the relevant inode is not within the scope of the listening inode because the listening inode is not the relevant inode. If the scope of the listening inode is children, then the process proceeds to state 1108. In state 1108, the participant module determines whether the respective listening inode is the parent of the relevant inode. If the respective listening inode is the parent of the relevant inode, then the relevant inode is within the scope of the respective listening inode because the scope of the respective listening inode is children, and the process proceeds to state 1110, where the respective listening inode is added to the listening set 804 of the relevant inode. If, on the other hand, the respective listening inode is not the parent of the relevant inode, then the relevant inode is not within the scope of the listening inode. In that case, the process proceeds to state 1112, ending the corresponding loop of instructions for that respective listening inode. As explained above, in one embodiment, the operations between states 1102 and 1112 execute for each respective listening inode in the listening set 804 of the parent of the relevant inode. As described above, in one embodiment, the participant module executes the process, though in other embodiments, other modules, such as the initiator module, may execute the process.

C. Examples of Validating the Event Cache

Figure 12B:
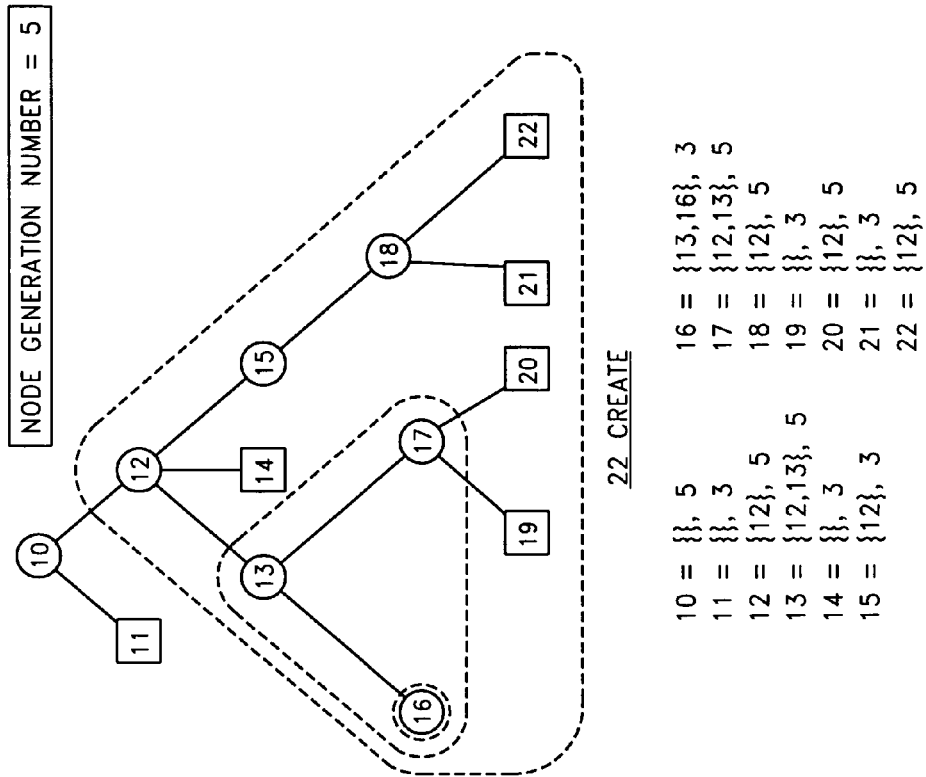
FIGS. 12A and 12B illustrate one embodiment of the status of caches following a "size change" and a "create" event, respectively.
Figure 12A:
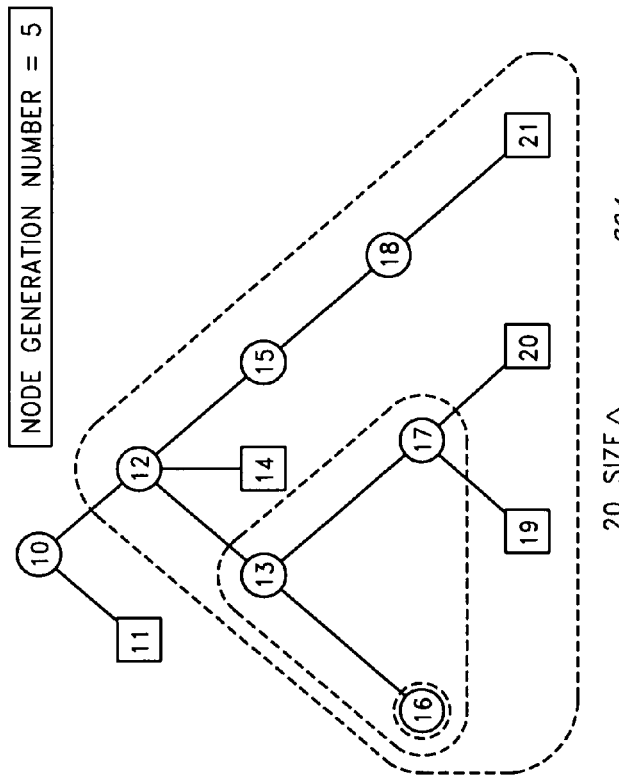

FIGS. 12A and 12B illustrate one embodiment of validating the event caches of the inode tree 300 following certain events. FIG. 12A illustrates stages of validating event caches in the inode tree 300 following a "size change" event on the file corresponding to inode 20. FIG. 8A illustrates the event caches of the inode three 300 before the "size change" event. Beginning with the relevant inode as 20, the process first attempts to validate the event cache of inode 20. Because the cache generation number 806 of inode 20 does not match the node generation number 502, the process proceeds to determine whether inode 20 is the root. Because inode 20 is not the root, the process proceeds to validate the event cache of the parent, inode 17. Because the cache generation number 806 of inode 17, currently, the relevant inode, does not match the node generation number 502, and because inode 17 is not the root, the process proceeds to validate the event cache of the parent, inode 13. (This is the second recursive call.) Because the cache generation number 806 of inode 13 does not match the node generation number 502, and because inode 13 is not the root, the process attempts to validate the event cache of the parent, inode 12. (This is the third recursive call.) Because the cache generation number 806 of inode 12 does not match the node generation number 502, and because inode 12 is not the root, the process attempts to validate the event cache of the parent, inode 10. (This is the fourth recursive call.) Although the cache generation number 806 of 10 does not match the node generation number 502, the inode 10 is the root, so the process does not make another recursive call to validate the event cache of the parent, and the process proceeds to state 1010 (still in the fourth nested call). Because inode 10 is not a listening inode, the process proceeds to state 1014, where the cache generation number 806 of inode 10 is updated to the value of the node generation number 502. Having terminated the fourth and final recursive call, the process begins to unwind.

Starting with state 1008 in the third nested call, the process proceeds to update the cache of the relevant inode with the cache of the parent of the relevant inode. At this point, the relevant inode is inode 12. The process updates the event cache of inode 12 with the event cache of inode 10. Because the listening set 804 of inode 10 is empty, the process proceeds from state 1102 to 1112 and returns to state 1010. Because inode 12 is a listening inode, the process proceeds to state 1012, where inode 12 is added to the listening set 804 of inode 12. The cache generation number 806 of inode 12 is then updated, and the algorithm unwinds down the recursive call stack, returning to state 1008 in the second nested call.

At this point, the relevant inode is inode 13. The process then updates the event cache of inode 13 with the cache of the parent, which is inode 12. Because there is one listening inode in the listening set 804 of inode 12, the operations between states 1102 and 1112 execute once. Because the scope of listening inode 12 is recursive, the process adds inode 12 to the listening set 804 of inode 13 and returns to state 1010. Because inode 13 is a listening inode, inode 13 is added to the listening set 804 of inode 13, which now includes 12 and 13. The cache generation number 806 of inode 13 is then updated, and the recursive call stack unwinds another level to the first recursive call.

At this point, the relevant inode is 17. The process then updates the event cache of inode 17 with the event cache of the parent, which is inode 13. Because there are two listening inodes in the listening set 804 of inode 13, the operations between 1102 and 1112 are executed twice, once for inode 12 and then once for inode 13. Because the scope of inode 12 is recursive, inode 12 is added to the listening set 804 of inode 17, and the process begins the next loop with inode 13 as the respective listening inode. Because the scope of inode 13 is children and because inode 13 is the parent of inode 17, inode 13 is added to the listening set 804 of inode 17. After finishing both loops, the process returns to state 1010. Because inode 17 is not a listening inode, the process proceeds to update the cache generation number 806 of inode 17 and then to return to the original call state.

The relevant inode is now the original relevant inode, which is inode 20. The process then updates the event cache of inode 20 with the event cache of the parent, inode 17. Because inode 17 includes two listening inodes in its listening set 804, the operations between states 1102 and 1112 are executed twice. Because the scope of the first listening inode, inode 12, is recursive, inode 12 is added to the listening set 804 of inode 20. Because the scope of listening inode 13 is not recursive and because the listening inode 13 is not the parent inode 20, the process returns to state 1010 without adding inode 13 to the listening set 804 of inode 20. Because inode 20 is not a listening inode, the process updates the cache generation number 806 of inode 20, which validates inode 20, the relevant inode.

FIG. 12A illustrates the state of each event cache in the inode tree 300 following the execution of the "size change" event on inode 20. Thus, inodes 10, 12, 13, 17, and include up-to-date caches. The remaining inodes, however, include out-of-date event caches.

FIG. 12B illustrates the up-to-date status of the event cache of each inode in the inode tree 300 following the execution of a "create" inode 22 event. In the case of a "create" event, the event system first validates the parent directory, and then the new child inherits the event cache of the up-to-date parent. Thus, the process first attempts to validate the parent directory of inode 22, which is inode 18. Because the cache generation number 806 of inode 18 does not match the node generation number 502, and because inode 18 is not the root, the process proceeds to validate the event cache of the parent, inode 15. (This is the first recursive call.) Because the cache generation number 806 of inode 15 does not match the node generation number 502, and because inode 15 is not the root, the process proceeds to validate the event cache of the parent, inode 12. (This is the second recursive call.) Because the cache generation number 806 of inode 12 matches the node generation number 502, the process terminates the last recursive call, returning to the first recursive call. At this point, the process executes in a similar manner as it did for the previous "size change" event on inode 20. Starting with inode 15, the respective relevant inode is updated with the up-to-date event cache of the parent, none of the respective relevant inodes are added to their own listening sets 802 (because there are no listening inodes in this branch of the tree), and the cache generation number 806 of each respective relevant inode is updated. Once inode 22 has been created, it inherits the up-to-date event cache of inode 18. At this point, the inodes 10, 12, 13, 15, 17, 18, 20, and 22 have up-to-date caches, and the remaining inodes still have caches that are not up-to-date. FIG. 8B illustrates the event caches of the inode tree 300 after all the event caches have been validated.

The following is one embodiment of exemplary code for implementing the validate event cache algorithm:

```
update_cache_from_parent(inode, parent) {
    /* Take all lins from the parent that are relevant to us */
    for each <lin> in parent->event_lins {
        if (scope_is_recursive(lin))
            lin_set_add(inode->event_lins, lin);
        else if (scope_is_children(lin) and lin == parent->lin)
            lin_set_add(inode->event_lins, lin);
    }
}
update_cache(inode) {
    /* If we're up to date, we're done. */
    if (inode->gen == global_gen)
        return;
    if (is_not_root(inode)) {
        /* Make sure our parent is up to date */
        update_cache(inode->parent);
        /* Update our cache from our parent */
        update_cache_from_parent(inode, inode->parent);
    }
    /* See if we have an entry in the event hash */
    if (in_event_hash(inode))
        lin_set_add(inode->event_lins, inode->lin);
    /* Update our generation number to the latest global gen */
    inode->gen = global_gen;
}
```

IV. Notifying Listeners of Events

Figure 13:
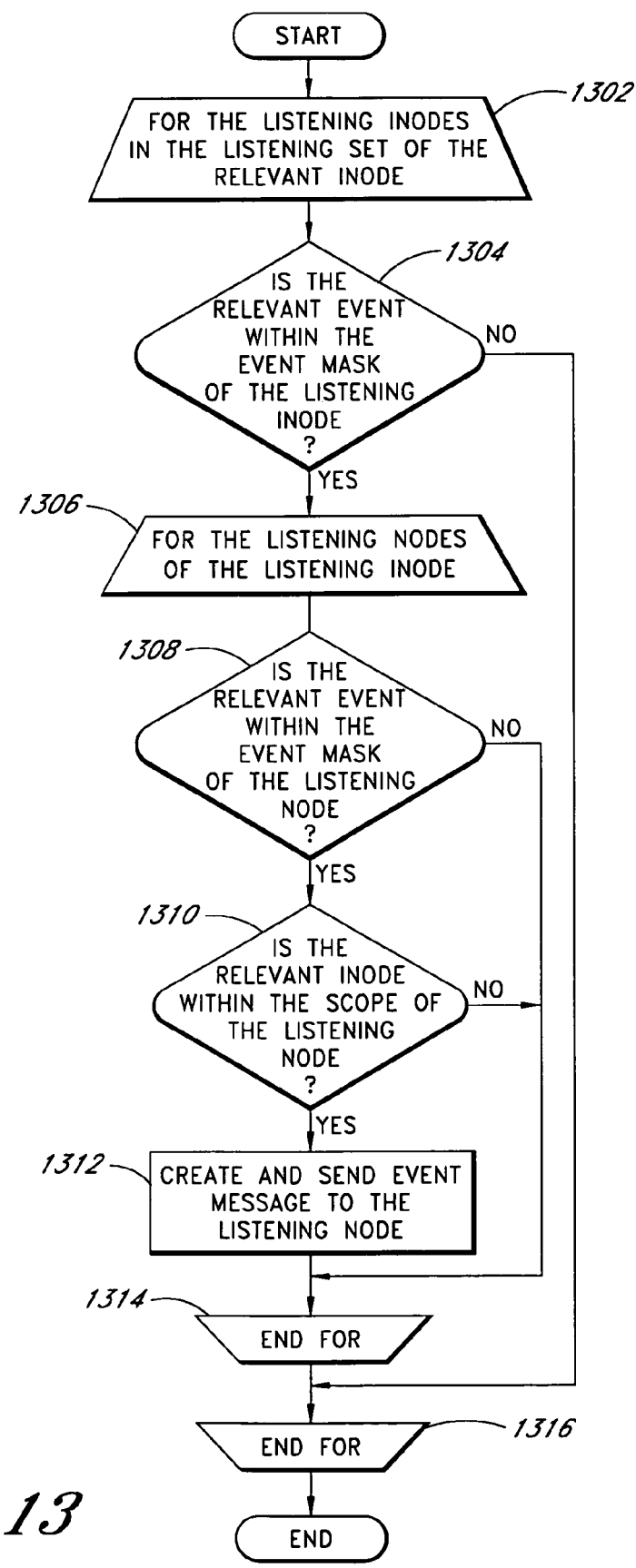
FIG. 13 illustrates one embodiment of a flowchart of operations of the participant module to send event messages to listening nodes.

FIGS. 13 through 16 illustrate additional embodiments of the operation of state 908 illustrated in FIG. 9. Sending event messages to listening processes 410 includes two principal sets of operations, depicted in FIGS. 13 and 16, respectively. FIG. 13 illustrates one embodiment of a flowchart of operations executed by participant modules. FIG. 16 illustrates one embodiment of a flowchart of operations executed by initiator modules upon receiving event messages from the participant modules. Although in the illustrated embodiment the processes depicted in FIGS. 13 and 16 are executed by the participant and initiator modules, respectively, in other embodiments, these processes may be executed by other modules and/or executed by the same module.

A. Sending Event Messages

FIG. 13 illustrates one embodiment of the flowchart of operations to send event messages to the listening nodes. The operations between states 1302 and 1316 are executed for as many respective listening inodes as are in the listening set 804 of the relevant inode, where the relevant event is the event on the relevant inode being processed. If, in state 1304, it is determined that the relevant event is within the event mask of the respective listening inode, the process proceeds to state 1306. If, on the other hand, it is determined that the relevant event is not within the event mask of the respective listening inode, the process terminates the respective iteration.

The operations between states 1306 and 1314 are executed as many times as there are listening nodes for the listening inode. Thus, if there are two nodes 102 in the cluster 108 that are listening for the respective listening inode, the operations between state 1306 and state 1314 execute twice. In state 1308, the process determines whether the relevant event is within the event mask of the respective listening node. If the relevant event is not within the event mask of the respective listening node, then the process terminates the respective iteration. If, on the other hand, the relevant event is within the event mask of the respective listening inode, then the process proceeds to state 1310, where it determines whether the relevant inode is within the scope of the respective listening node. If the relevant inode is not within the scope of the respective listening node, the process terminates the respective iteration. If, on the other hand, the relevant inode is within the scope of the listening node, then the process proceeds to state 1312, where the process creates and sends an event message to the respective listening node. As described above, in one embodiment, the participant module executes the process, though in other embodiments, other modules may execute the process.

FIG. 13 illustrates one embodiment of operations for sending event messages from the participant modules to the respective initiator modules, which correspond to the respective listening nodes. These operations are accomplished in a two-step process. First, it is determined whether the relevant event falls within the event mask of any of the listening inodes within the listening set 804 of the relevant inode. Second, it is determined, for any of the qualifying listening inodes, whether the relevant event falls within the event masks of listening nodes corresponding to the respective listening inode and whether the relevant inode is also within the scope of any of the listening nodes corresponding to the respective listening inode. It is recognized that in other embodiments, the process could first check the scope and then check the event mask.

Figure 14:
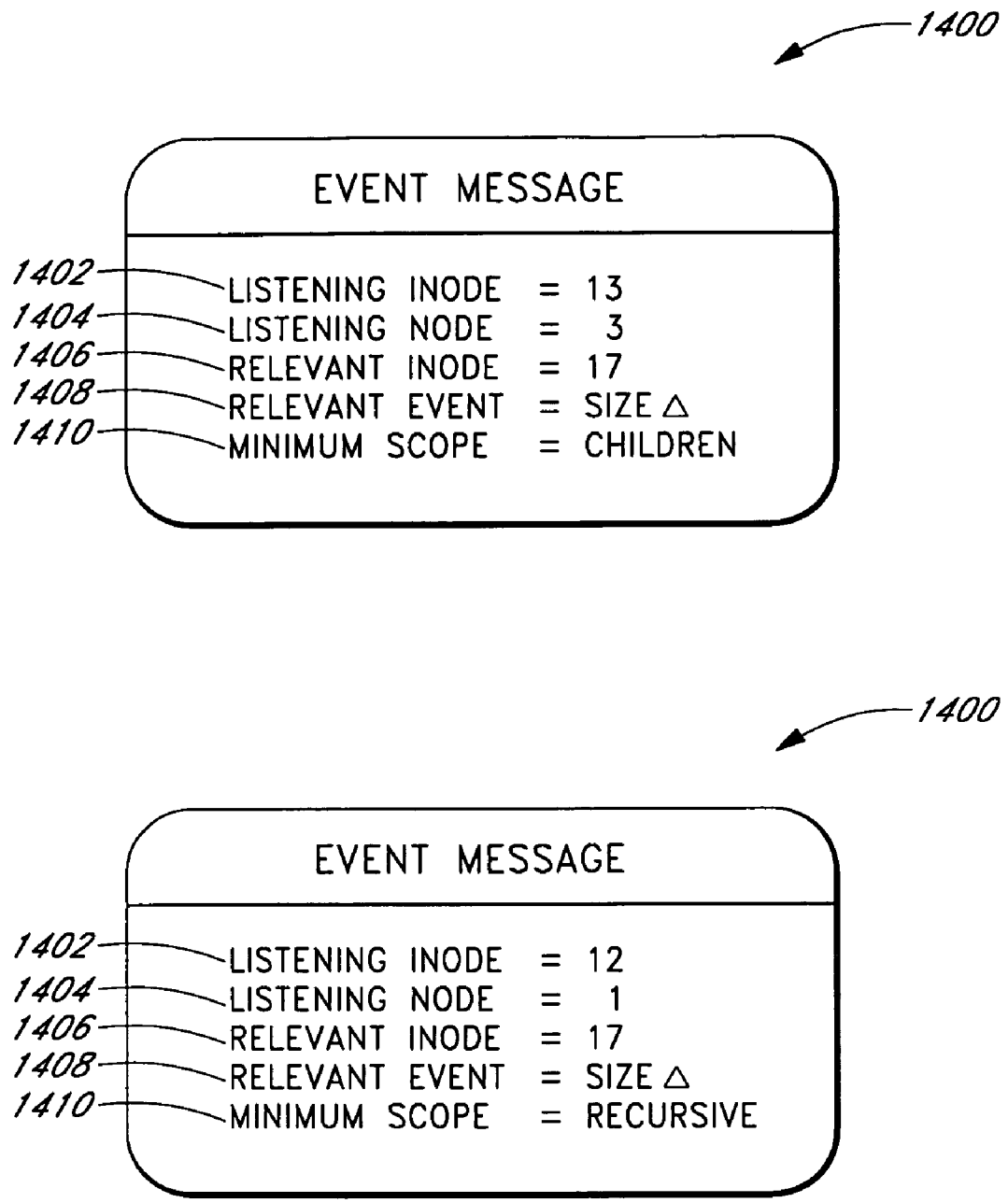
FIG. 14 illustrates one embodiment of two event messages.

FIG. 14 illustrates one embodiment of event messages. In one embodiment, participant modules send event messages 1400 to initiator modules to apprise them of events on relevant inodes for which respective listening processes 410 may be monitoring. An exemplary event message 1400 may include several fields. An event message may include a listening inode field 1402. This field apprises the initiator module of the listening inode that triggered the event message. An event message 1400 may also include, a listening node field 1404. The listening node is the node 102 that initiated at least one listener on the listening inode specified in the listening inode field 1402. In some embodiments, there may be no field for the listening node. In these embodiments, the event message is merely directed to the appropriate listening node, and the event message 1400 does not identify the node to which it was directed. The event message 1400 may also include a relevant inode field 1406. The relevant inode field 1406 identifies the inode upon which the event occurred that triggered the event message. An event message 1400 may also include a relevant event field 1408. The relevant event field 1408 identifies the type of event that triggered the event message 1400.

An event message 1400 may also include a minimum scope field 1410. The minimum scope identifies the minimum scope necessary to trigger the event message 1400. In other words, the minimum scope is the minimum scope of the listening inode that would have included the relevant inode for purposes of determining whether to send an event message. For instance, with regards to FIGS. 12A and 12B, if the listening inode is 13 and the relevant inode is 17, then the minimum scope for triggering an event message would be the children scope. If, on the other hand, the listening inode is inode 12 and the relevant inode is inode 17, then the minimum scope to trigger an event message would be the recursive scope. If, in yet another example, the listening inode were 13 and the relevant inode were also 13, then the minimum scope for triggering the event message would be the single scope.

B. Determining Minimum Scope

Figure 15:
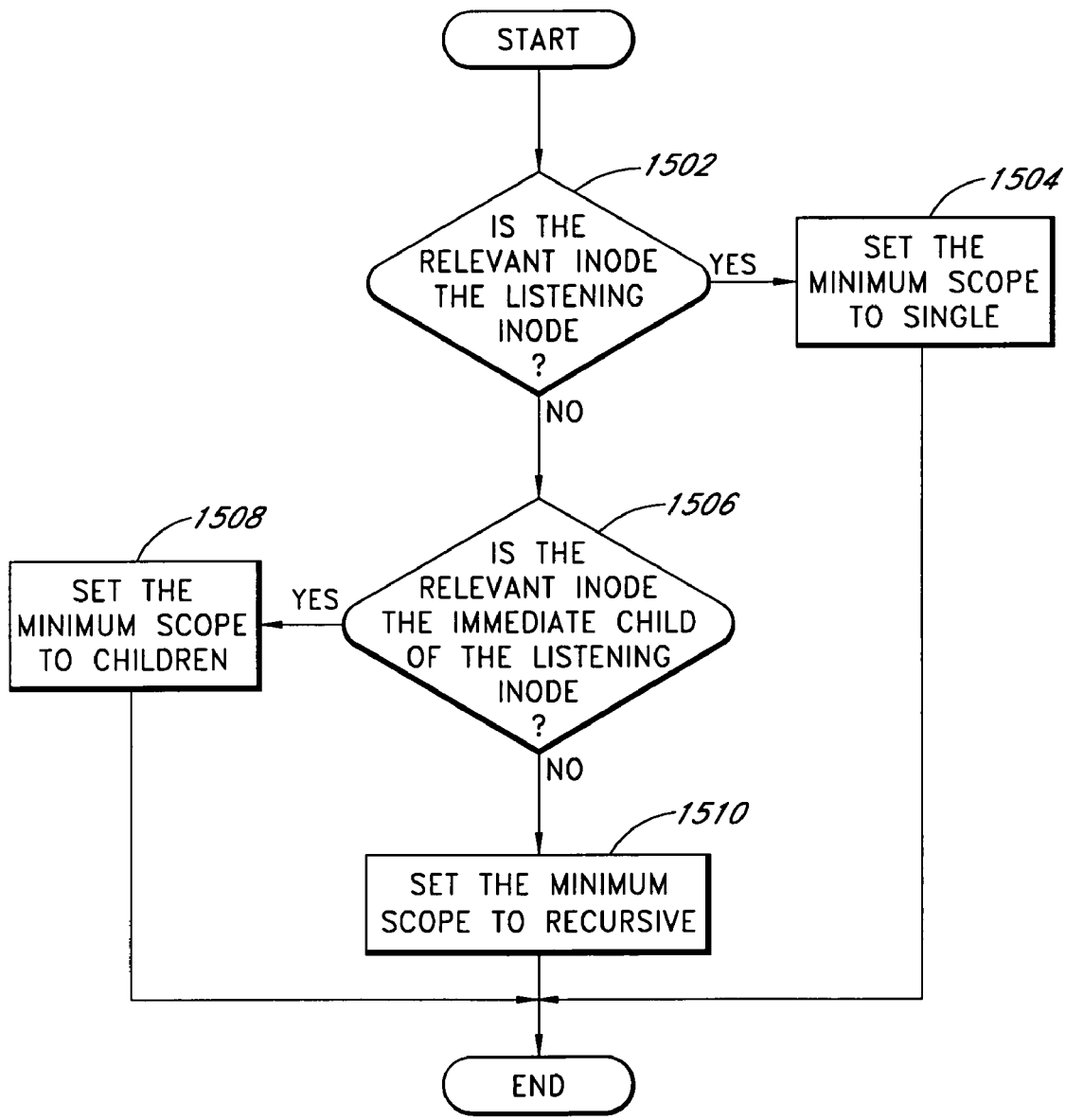
FIG. 15 illustrates one embodiment of a flowchart of operations to determine the minimum scope.

FIG. 15 illustrates one embodiment of a flowchart of the operations to determine the minimum scope. In state 1502, the process determines whether the relevant inode is the listening inode. If the relevant inode is the listening inode, then the participant module sets the minimum scope to single 1504. If, on the other hand, the relevant inode is not the listening inode, then the process determines whether the relevant inode is the immediate child of the listening inode 1506.

If the relevant inode is the immediate child of the listening inode, then the process sets the minimum scope to children 1508. If, on the other hand, the relevant inode is not the immediate child of the listening inode, then the process sets the minimum scope to recursive 1510. In one embodiment, the participant module executes the process to determine minimum scope, though in other embodiments, other modules, such as the initiator module, may execute this process to determine the minimum scope.

For example, with regard to FIGS. 12A and 12B, if the listening inode is 12, then the following are the minimum scopes for the respective relevant inodes. If the relevant inode is inode 12, then the minimum scope is single. In other words, the minimum scope necessary for a listener on inode 12 to cause an event message to be sent from inode 12 is the single scope. If the relevant inode is 15, then the minimum scope is children. In other words, the minimum scope necessary for an event on the relevant inode 15 to trigger an event message to the listener attached to inode 12 would be the children scope. If the relevant inode is 18, then the minimum scope would be recursive. In other words, the minimum scope necessary for an event on inode 18 to trigger an event message being sent to the listener attached to inode 12 would be the recursive scope.

C. Notifying Processes

FIG. 16 illustrates one embodiment of a flowchart of the operations to notify the listening processes 410 of relevant event messages. In one embodiment, relevant event messages are those event messages corresponding to relevant events for which listeners on the respective listening node are listening. Relevant event messages are those event messages that queued in an event queue of a listener. In the illustrated embodiment, not all relevant events result in relevant event messages. In other words, relevant events may trigger an event message that is never queued. This scenario is discussed in more detail below. In state 1602, the initiator module receives an event message from the participant module. In some embodiments, the participant module and the initiator module may reside on the same physical node 102, even though they are different logical modules.

In one embodiment, the operations between states 1604 and 1614 are repeated for as many times as there are process structures 406 for the listening inode. The process determines the listening inode from the event message 1400. By consulting the respective initiator hash table 400, the process determines which listening processes 410 are listening to the listening inode. For example, with reference to FIG. 4A, there are two processes, Process 3000 and Process 3001, listening to inode 12. Thus, in this example, the operations between 1604 and 1614 would be executed twice, once each time for each listening process (or, in other words, each process structure 406 corresponding to a particular listening process 410). In state 1606, the process determines whether the relevant event, delivered by the event message 1400, is within the event mask of the listening process. If it is not within the event mask of the listening process, then the process proceeds to state 1614, and the respective iteration terminates. If, on the other hand, the relevant event is within the event mask of the listening process, then the process determines, in state 1608, whether the minimum scope that could have generated the event message is less than or equal to the scope of the listening process. In the illustrated embodiment, the single scope is less than the children scope and the children scope is less than the recursive scope. State 1606 tests whether the listener is listening for the event. State 1608 tests whether the listener listens for the relevant inode. If either of these conditions fails, then the event is not an event being listened for and this iteration of instructions terminates. Thus, in some embodiments, event messages 1400 may be sent to an initiator module without the event message 1400 being queued in one of the event queues 408 of a corresponding listening structure 406. This is due to the fact that a participant evaluated the composite scope and the composite event mask of all listeners for a particular listening inode. Some listeners, however, may be listening for different events within different scopes. Therefore, sometimes event messages 1400 will be routed to a respective initiator module without being added to the event queue 408 of any process structure 406.

In state 1610, the relevant event is added to the event queue 408 of respective process structure 406. In state 1610, the respective event queue 408 may also be coalesced in some embodiments. In some embodiments, the process determines whether the event message 1400 is repetitive of other event messages. If the event message 1400 is repetitive, then it is not added to the respective event queue 408. In state 1612, the listening process is woken up and notified there are events available in the respective event queue 408. As described above, in one embodiment, the initiator module executes the process illustrated in FIG. 16 (as distinguished from the listening process), though in other embodiments, other modules, such as the participant module, may execute the process.

TABLE 1

| Relevant Inode | Event | Listening Set | Listening Nodes | Listening Processes |
|---|---|---|---|---|
| 22 | Create | {12} | 1 | 3,000 |
| 12 | Size Δ | {12} | 1, 3 | 3,001 |
|  |  |  |  | 2,004 |
| 16 | Size Δ | {12, 13, 16} | 1, 3 | 2,003 |
| 13 | Size Δ | {12, 13} | 1, 3 | 3,001 |
|  |  |  |  | 2,001 |
|  |  |  |  | 2,002 |
| 13 | Remove | {12, 13} | 3 | 2,000 |

Table 1 illustrates one embodiment of results of events on the particular inodes within the inode tree 300. The first example in Table 1 is a "create" event for a new inode, inode 22. As illustrated in FIG. 12B, the up-to-date listening set 804 of inode 22 include only listening inode 12. With reference to FIG. 13, the operations between states 1302 and 1316 would execute once, for the single listening inode within the listening set 804 of the relevant inode 22. Because the "create" event is within the event mask of listening inode 12, as illustrated in FIG. 5, the process progresses from state 1304 to state 1306. Because there are two listening nodes for listening inode 12, the operations between state 1306 and state 1312 execute twice. On the first pass, with respect to Node 1, the process progresses from state 1308 to state 1310 because the "create" event is within the event mask of listening Node 1, as illustrated in FIG. 5. Because the scope of the node structure 506 of Node 1 is recursive, the relevant inode 22 is within the scope of the listening node, and, in state 1312, the process creates and sends an event message to Node 1. On the second pass, with respect to node 3, the process determines that the "create" event is not within the event mask of the listening node, which causes the iteration to terminate without sending an event message to Node 3 with regards to the relevant message.

As described above, FIG. 16 illustrates one embodiment of a flowchart of operations that the initiator module executes upon receiving an event message 1400 from a participant node, in state 1602. Because there are two listening processes for the listening inode 12, the operations between states 1604 and 1614 execute twice. During the first pass, the respective listening process is Process 3000. Because the "create" event is within the event mask of the listener requested by Process 3000, the process proceeds from state 1606 to state 1608. Because the minimum scope that would have generated the event message is equal to the scope requested by Process 3000, as both scopes are recursive, the event message 1400 is added to the event queue 408 of the process structure 406 corresponding to Process 3000. In state 1610, the respective event queue 408 may also be coalesced in some embodiments. In some embodiments, the process determines whether the event message 1400 is repetitive of other event messages. If the event message 1400 is repetitive, then it is not added to the respective event queue 408. In state 1612, the listening process, Process 3000, is woken up and notified there are events available in the respective event queue 408. In the second pass of the instructions between states 1604 and 1614, the listening process is Process 3001. Because the "create" event is not within the event mask of the listener requested by Process 3001, the initiator module ends.

The second example in Table 1 is a "size change" to inode 12. As illustrated in FIG. 8B, the up-to-date listening set 804 of inode 12 comprises only listening inode 12. As illustrated in FIG. 5, both Nodes 1 and 3 listen for "size change" events. Furthermore, inode 12 is within the scope of the respective node structure 508 for both nodes 1 and 3 because inode 12 is the listening inode. Thus, the participant module sends event messages 1400 to both Nodes 1 and 3. Because both Processes 2004 and 3001 listen for the "size change" event, the event messages 1400 sent to Nodes 1 and 3 are placed into the corresponding event queues 408 of the respective listener structures 406.

The third example in Table 1 is a "size change" to inode 16. As illustrated in FIG. 8B, the up-to-date listening set 804 for inode 16 includes listening inodes 12, 13, and 16. With respect to listening inode 12, the participant module sends an event message 1400 only to Node 1 because the listeners on Node 3 attached to listening inode 12 specify the single scope, and inode 16 is not inode 12. With respect to listening inode 13, the participant module sends an event message 1400 to Node 3, as the listeners for inode 13 on Node 3 listen for "size change" events and have a composite scope of children, and inode 16 is a child of inode 13. Similarly, with respect to inode 16, the participant module sends an event message 1400 to Node 3, as the listeners for inode 16 on Node 3 listen for "size change" events and have a composite scope of recursive.

Although three event messages 1400 were sent, only one of the event messages is placed into a corresponding event queue 408 of a respective process structure 406. With regard to the event message 1400 specifying inode 12 as the listening inode, the event message 1400 is not queued because the scope of the Process 3001 is only the children scope, and the minimum scope necessary to trigger an event on inode 16 based on listening inode 12 is the recursive scope, which is greater than the children scope. Although Process 3000 has a recursive scope, it only listens for the "create" event, not the "size change" event. Thus, this event message 1400 reaches the respective initiator module, but is never queued. Similarly, the event message 1400 directed to Node 3 with respect to listening inode 13 is also not queued. The Process 2000 does not listen for the "size change" event and Processes 2001 and 2002 have single scope, and the minimum scope required to trigger an event message from inode 16 arising from listening inode 13 is the children scope, which is greater than the single scope. In contrast, the event message 1400 sent to Node 3 with respect to listening inode 16 is placed on the corresponding event queue 408 of the respective process structure 406. Process 2003 listens to events within the recursive scope of inode 16, and listens for "size change" events. Because a "size change" event on inode 16 is within the scope and the event mask of the listener attached by Process 2003, the respective event message 1400 is queued in the event queue 408 corresponding to Process 2003.

Example 4 in Table 1 illustrates a "size change" event to inode 13. As illustrated in FIG. 8B, the listening set 804 of inode 13 includes inodes 12 and 13. As illustrated in FIG. 5, with respect to listening inode 12, Node 1 listens for all events within the recursive scope of inode 12 and also listens for the "size change" event. Therefore, an event message 1400 is sent to Node 1. Still with respect to listening inode 12, because the listeners on Node 3 only listen to events within the single scope of inode 12, no event message is sent to Node 3. With respect to listening inode 13, because the listeners on Node 3 listen for the "size change" event, and because inode 13 is within the scope of listening inode 13, an event message 1400 is sent to Node 3.

The event message 1400 sent to Node 1, with respect to listening inode 12, is queued in the event queue 408 corresponding to Process 3001 because inode 13 is within the children scope of inode 12 and because Process 3001 listens for the "size change" event. The same event is not queued in the event queue 408 corresponding to Process 3000 because that listener listens only for "create" events. With respect to the event message 1400 sent to Node 3, with respect to inode 13, the event message 1400 is queued in the event queues 408 corresponding to Processes 2001 and 2002 because inode 13 is within the single scope of inode 13 and because Processes 2001 and 2002 listen for the "size change" event.

The fifth example in Table 1 is a "remove" event on inode 13. As illustrated in FIG. 8B, the up-to-date listening set 804 of inode 13 comprises listening inodes 12 and 13. As illustrated in FIG. 5, none of the nodes listening to the listening inode 12 listens for the "remove" event. This is illustrated in the participant structure 506 for inode 12. The corresponding event mask does not include the "remove" event. The participant structure 506 for inode 13, however, does include the "remove" event. An event message 1400 is created and sent to Node 3 because inode 13 is within the children scope of inode 13 and because the "remove" event is within the event mask of the node structure 508 corresponding to node 3. With respect to FIG. 4C, only Process 3000 listens for the "remove" event. Because inode 13 is within the children scope of listening inode 13, the "remove" event on inode 13 is queued in the event queue 408 corresponding to Process 2000.

V. Updating Hash Tables Following a Group Change

Figure 17:
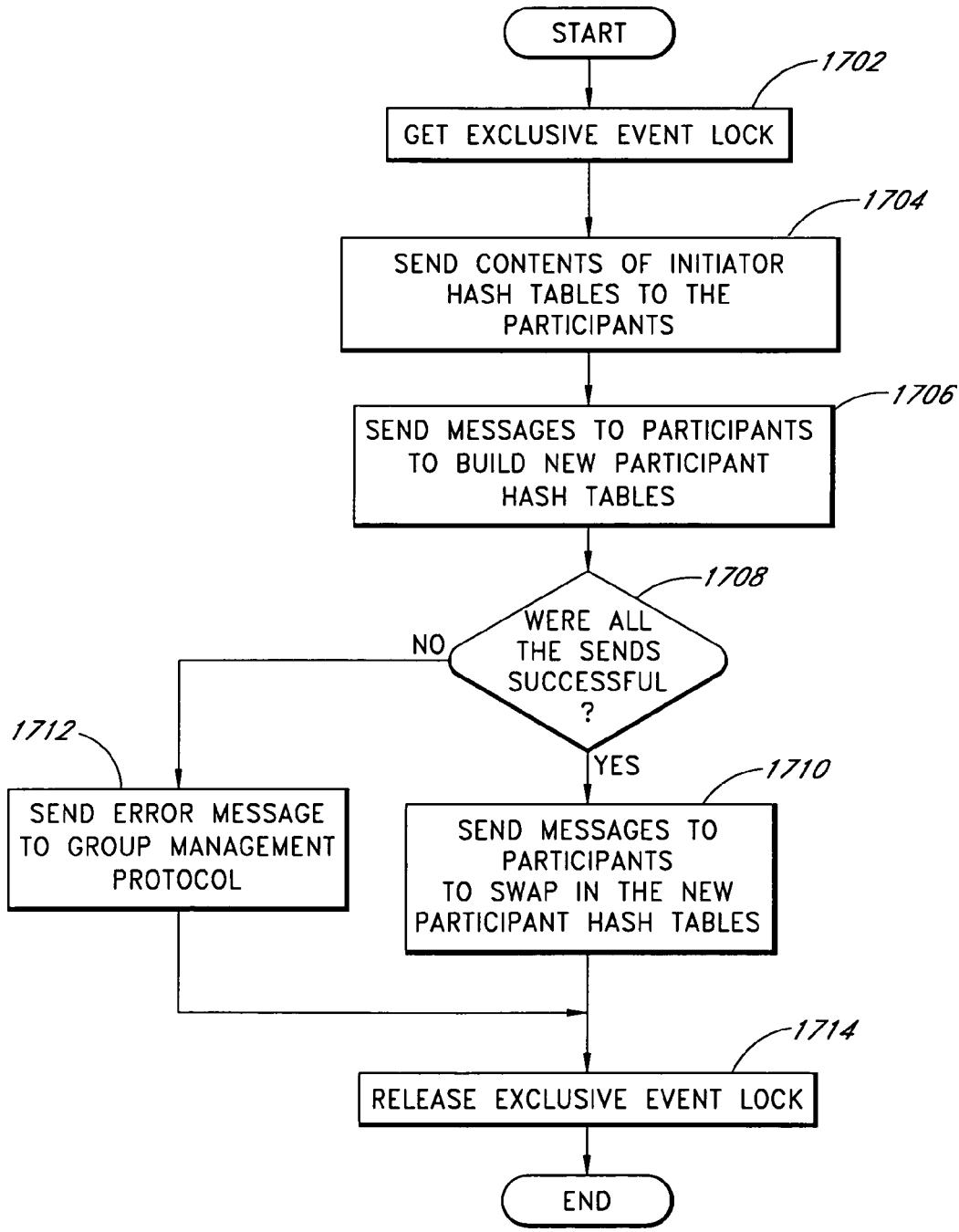
FIG. 17 illustrates one embodiment of a flowchart of operations to update initiator and participant hash tables following the addition of a node to the system.

FIG. 17 illustrates one embodiment of a flowchart of the operations to add a node 102 to a cluster 108, and, accordingly, to update the participant hash tables 500. In state 1702, the process acquires an exclusive event lock, preventing other nodes from reading from or writing to the system. FIG. 17 illustrates a group of operations, referred to collectively as a process. In state 1704, the process of the nodes 102 within the cluster 108 send the contents of their respective initiator hash tables 400 to the other nodes 102. In state 1706, the process sends messages to the participant modules to build new participant hash tables 500 based on the sent initiator hash tables 400. If all of the sends were successful, as determined in state 1708, then the process instructs the participant modules to swap in the new participant hash tables, in state 1710. If all of the sends were not successful, then the process sends an error message to the Group Management Protocol, in state 1712. After completing state 1712 or state 1710, the process releases the exclusive lock in state 1714. In one embodiment, the initiator module executes the process illustrated in FIG.

17, though in other embodiments, other modules, such as the participant module, may execute the process.

VI. Conclusion

While certain embodiments of the invention have been described, these embodiments have been presented by way of example only, and are not intended to limit the scope of the present invention. Accordingly, the breadth and scope of the present invention should be defined in accordance with the following claims and their equivalents.

By way of example, the following alternatives are also contemplated, though not described in detail. Although the data structures described herein have been addressed to a distributed system, some embodiments of the invention may be used in a single file system. In such a system, there may be only an initiator hash table, and the processes described above may all reference it. Additionally or alternatively, the data structures may also be organized such that the queue of events appears on the participant side, rather than the initiator side. Moreover, the event system described above explained that some event messages may arrive to the initiator, but may never be queued. In other embodiments, the data structures could be changed to track listener processes on the participant side. The above-mentioned alternatives are examples of other embodiments, and they do not limit the scope of the invention. It is recognized that a variety of data structures with various fields and data sets may be used. In addition, other embodiments of the flow charts may be used.

What is claimed is:

1. A system for listening for events on a distributed file system, the system comprising:
   a plurality of nodes in communication via a network each node comprising a processor and a memory;
   a plurality of files that are logically organized in a tree and each file distributed over the network so as to be stored, in parts, across the memories of two or more of the plurality of nodes;
   a plurality of metadata blocks stored in the memories among the plurality of nodes, each metadata block associated with one of the plurality of files and comprising location information for one or more content data blocks of the one of the plurality of files; and
   a participant data structure stored in the memories of the plurality of nodes, the participant data structure comprising:
      a plurality of file structures, each file structure related to one of the plurality of files and comprising:
         data identifying nodes that have one or more processes that are listening for events from the plurality of nodes that affect the corresponding file; and
         an indication of the currentness of the file structure;
      an initiator data structure stored in the memories of the plurality of nodes, the initiator data structure comprising:
         a plurality of file structures, each file structure related to one of the plurality of files and comprising data identifying processes running on the corresponding node that are listening for events that affect the corresponding file;
   a first message module running on the processor of a first node of the plurality of nodes and configured to, after an event affecting a first file of the plurality of files occurs, search the participant data structure of the first node to identify at least a second node of the plurality of nodes that is listening for events that affect the first file and send an event message to the second node; and
   a second message module running on the processor of the second node and configured to receive the event message and search the initiator data structure of the second node to identify processes running on the second node that are listening for events that affect the first file.

2. The system of claim 1 wherein the indication of the currentness of the participant data structure is a generation number.

3. The system of claim 1, further comprising:
   an update module stored in the memory of one or more of the nodes and configured to update the file structures of the participant data structure that correspond to a subset of the plurality of files that represent one branch of the tree.

4. The system of claim 3, wherein the update module is further configured:
   to begin with the file structure that corresponds to the leaf node file of the one branch;
   to climb the one branch, reviewing the corresponding file structure of the file at each climbed level in the one branch, until reaching a file structure whose indication indicates that the file structure is current; and
   from that level, to traverse down the one branch to the leaf node file updating the corresponding file structure of the file at each traversed level in the one branch.

5. The system of claim 4, wherein the update module is further configured:
   to update the corresponding file structure of the file at each traversed level in the one branch using the corresponding file structure of the file's parent.

6. A method for listening for events in a distributed file system, the method comprising:
   logically organizing a plurality of files in a tree and storing each of the plurality of files so that the files are distributed over a network, in parts, across one or more subsets of a plurality of nodes in communication via the network and, for each of the plurality of files,
   storing a plurality of metadata blocks in the memories among the plurality of nodes, each metadata block associated with one of the plurality of files and comprising location information for one or more content data blocks of the one of the plurality of files; and
   storing a participant data structure corresponding to each file, the participant data structure comprising:
      information identifying nodes that have processes that are listening for events from the plurality of nodes that affect the corresponding file; and
      an indication of the currentness of the data structure;
   storing an initiator data structure corresponding to each node, the initiator data structure comprising:
      information related to each of the plurality of files and comprising data identifying processes running on the corresponding node that are listening for events that affect the corresponding file;
   searching the participant data structure of a first node of the plurality of nodes after an event affecting a first file of the plurality of files occurs to identify at least a second node of the plurality of nodes that is listening for events that affect the first file;
   sending an event message to the second node;
   receiving the event message at the second node; and
   searching the initiator data structure of the second node to identify processes running on the second node that are listening for events that affect the first file.

7. The method of claim 6 further comprising:
updating the participant data structures that correspond to a subset of the plurality of files that represent one branch of the tree.

8. The method of claim 7 further comprising
starting with the participant data structure that corresponds to the leaf node file of the one branch;
climbing the one branch;
reviewing the corresponding participant data structure of the file at each climbed level in the one branch, until reaching a data structure whose information indicates that the data structure is current; and
from that level, traversing down the one branch to the leaf node file and updating the corresponding participant data structure of the file at each traversed level in the one branch.

9. The event listening method of claim 8 further comprising:
updating the corresponding participant data structure of the file at each traversed level in the one branch using the corresponding data structure of the file's parent.

10. A storage medium having a computer program stored thereon for causing a suitably programmed system to process the computer program by performing the method of claim 6 when such computer program is executed on the system.

11. The system of claim 1 wherein each of the file structures of the participant data structure is stored in the memory of each of the plurality of nodes.

12. The system of claim 1 wherein the data of the plurality of file structures of the participant data structure includes at least one of a process identifier, an indication of listening scope, and an indication of the listened-for events.

13. The method of claim 6 wherein the information of the participant data structure includes at least one of a process identifier, an indication of listening scope, and an indication of the listened-for events.

14. The system of claim 6 wherein each of the participant data structures and each of the initiator data structures is stored in the memory of each of the plurality of nodes.

* * * * *